US012666071B2

(12) United States Patent
Rhyu et al.

(10) Patent No.: US 12,666,071 B2
(45) Date of Patent: Jun. 23, 2026

(54) METHOD AND DEVICE FOR CONTROLLING TRANSMISSION OR RECEPTION OF DATA IN WIRELESS COMMUNICATION SYSTEM

(71) Applicant: Samsung Electronics Co., Ltd., Gyeonggi-do (KR)

(72) Inventors: Sungryeul Rhyu, Gyeonggi-do (KR); Eric Yip, Gyeonggi-do (KR); Kyunghun Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 503 days.

(21) Appl. No.: 18/013,756

(22) PCT Filed: Jun. 25, 2021

(86) PCT No.: PCT/KR2021/008015
§ 371 (c)(1),
(2) Date: Dec. 29, 2022

(87) PCT Pub. No.: WO2022/005116
PCT Pub. Date: Jan. 6, 2022

(65) Prior Publication Data
US 2023/0345030 A1 Oct. 26, 2023

(30) Foreign Application Priority Data

Jun. 29, 2020 (KR) ........................ 10-2020-0079527

(51) Int. Cl.
*G06K 9/36* (2006.01)
*G06K 9/46* (2006.01)
(Continued)

(52) U.S. Cl.
CPC ......... *H04N 19/463* (2014.11); *H04N 19/119* (2014.11); *H04N 19/136* (2014.11); (Continued)

(58) Field of Classification Search
None
See application file for complete search history.

(56) References Cited

U.S. PATENT DOCUMENTS 7,039,723 B2 5/2006 Hu et al.
9,332,253 B2 * 5/2016 Terada ................... H04N 19/70
(Continued)

FOREIGN PATENT DOCUMENTS

CN         110514198 A * 11/2019 ............. G01C 21/30
KR    10-2019-0052089      6/2019
(Continued)

OTHER PUBLICATIONS

CN-110514198-A (machine translation) (Year: 2019).*
(Continued)

*Primary Examiner* — Feng Niu
(74) *Attorney, Agent, or Firm* — The Farrell Law Firm, P.C.

(57) ABSTRACT

The present disclosure relates to a method and device for controlling transmission or reception of data in a wireless communication system, an operating method of a transmission user equipment (UE) in a wireless communication system including: obtaining a point cloud by photographing an object; transmitting, to a reception UE, a message including a parameter for transmission and reception of the point cloud, wherein the parameter for transmission and reception of the point cloud includes at least one of a parameter associated with a direction of the object or a space parameter associated with the object; receiving, from the reception UE, a response message including an application parameter of the reception UE, wherein the application parameter of the reception UE is determined based on the parameter for transmission and reception of the point cloud and a channel state of the reception UE; compressing the point cloud, based on the application parameter of the reception UE; and (Continued)

transmitting, to the reception UE, the compressed point cloud.

20 Claims, 42 Drawing Sheets

(51) Int. Cl.

| | |
|---|---|
| *H04N 19/119* | (2014.01) |
| *H04N 19/136* | (2014.01) |
| *H04N 19/164* | (2014.01) |
| *H04N 19/20* | (2014.01) |
| *H04N 19/42* | (2014.01) |
| *H04N 19/463* | (2014.01) |
| *H04N 21/2343* | (2011.01) |
| *H04N 21/236* | (2011.01) |
| *H04N 21/4402* | (2011.01) |
| *H04N 21/61* | (2011.01) |

(52) U.S. Cl.

CPC ........... *H04N 19/164* (2014.11); *H04N 19/20* (2014.11); *H04N 19/42* (2014.11); *H04N 21/2343* (2013.01); *H04N 21/236* (2013.01); *H04N 21/23605* (2013.01); *H04N 21/23614* (2013.01); *H04N 21/4402* (2013.01); *H04N 21/61* (2013.01); *H04N 21/6131* (2013.01); *H04N 21/6181* (2013.01)

(56) References Cited

U.S. PATENT DOCUMENTS

| | | | |
|---|---|---|---|
| 9,582,516 B2 | 2/2017 | Mckinnon et al. | |
| 10,170,127 B2 | 1/2019 | Jung et al. | |
| 10,652,536 B2 * | 5/2020 | Lim ..................... | H04N 19/119 |
| 10,869,059 B2 | 12/2020 | Mammou et al. | |
| 11,017,591 B2 * | 5/2021 | Oh ........................... | G06T 7/60 |
| 11,238,650 B2 * | 2/2022 | Li ......................... | G06V 10/776 |
| 11,381,867 B2 * | 7/2022 | Stockhammer .... | H04N 21/4431 |
| 11,388,427 B2 * | 7/2022 | Bouazizi .......... | H04N 21/42607 |
| 11,503,319 B2 * | 11/2022 | Ikai ..................... | H04N 19/103 |
| 11,508,096 B2 * | 11/2022 | Kuma .................. | H04N 19/167 |
| 11,803,986 B2 * | 10/2023 | Hur ........................... | G06T 9/40 |
| 11,856,230 B2 * | 12/2023 | Wang .................. | H04N 19/103 |
| 12,143,634 B2 * | 11/2024 | Iguchi .................... | G06T 9/001 |
| 12,149,681 B2 * | 11/2024 | Ma ......................... | H04N 19/61 |
| 12,231,649 B2 * | 2/2025 | Ma ...................... | H04N 19/136 |

| | | | |
|---|---|---|---|
| 2013/0188684 A1 * | 7/2013 | Terada ................. | H04N 19/176 |
| | | | 375/240.02 |
| 2016/0204908 A1 * | 7/2016 | Rafique ................. | H04W 24/08 |
| | | | 370/252 |
| 2019/0174133 A1 * | 6/2019 | Abe ...................... | H04N 19/157 |
| 2019/0313094 A1 * | 10/2019 | Kanoh ................. | H04N 19/159 |
| 2019/0342550 A1 * | 11/2019 | Lim ...................... | H04N 19/463 |
| 2019/0387211 A1 | 12/2019 | Drazic et al. | |
| 2020/0007882 A1 * | 1/2020 | Abe ...................... | H04N 19/137 |
| 2020/0014947 A1 * | 1/2020 | Abe ...................... | H04N 19/587 |
| 2020/0021856 A1 * | 1/2020 | Tourapis ............... | H04N 19/13 |
| 2020/0043199 A1 | 2/2020 | Chang et al. | |
| 2020/0043239 A1 * | 2/2020 | Lee ....................... | G06F 3/0488 |
| 2020/0045288 A1 | 2/2020 | Boyce | |
| 2020/0111236 A1 * | 4/2020 | Tourapis ................. | G06T 9/001 |
| 2020/0217937 A1 * | 7/2020 | Mammou ............. | G01S 7/4861 |
| 2020/0221159 A1 * | 7/2020 | Stockhammer .. | H04N 21/23439 |
| 2020/0260096 A1 * | 8/2020 | Ikai ......................... | H04N 19/96 |
| 2021/0005016 A1 * | 1/2021 | Oh ........................... | G06T 9/001 |
| 2021/0105451 A1 * | 4/2021 | Oyman ................ | H04N 19/597 |
| 2021/0218976 A1 * | 7/2021 | Bouazizi ............... | H04N 19/44 |
| 2021/0233284 A1 * | 7/2021 | Sugio ......................... | G06T 9/40 |
| 2021/0287430 A1 * | 9/2021 | Li ............................... | G06T 7/74 |
| 2021/0407142 A1 * | 12/2021 | Hur ........................ | H04N 19/30 |
| 2022/0060529 A1 * | 2/2022 | Oh ........................ | H04N 13/194 |
| 2022/0094982 A1 * | 3/2022 | Iguchi ................ | H04N 19/597 |
| 2022/0166814 A1 * | 5/2022 | Hamza .................. | H04N 19/70 |
| 2022/0239719 A1 * | 7/2022 | Gül ..................... | H04N 21/6587 |
| 2022/0239946 A1 * | 7/2022 | Park ...................... | H04N 19/60 |
| 2023/0052940 A1 * | 2/2023 | Ma ........................ | H04N 19/119 |
| 2023/0080546 A1 * | 3/2023 | Ma ........................ | H04N 19/176 |
| | | | 375/240.02 |
| 2024/0323337 A1 * | 9/2024 | Gül ......................... | H04L 65/70 |
| 2024/0348806 A1 * | 10/2024 | Boyce ................. | H04N 19/196 |

FOREIGN PATENT DOCUMENTS

| | | |
|---|---|---|
| KR | 10-2020-0007734 | 1/2020 |
| KR | 10-2020-0035133 | 4/2020 |

OTHER PUBLICATIONS

PCT/ISA/210, International Search Report dated Oct. 7, 2021 issued in counterpart application No. PCT/KR2021/008015, 5 pages.
PCT/ISA/237, Written Opinion dated Oct. 7, 2021 issued in counterpart application No. PCT/KR2021/008015, 4 pages.
Korean Office Action dated Apr. 22, 2024 issued in counterpart application No. 10-2020-0079527, 8 pages.

* cited by examiner

FIG. 4

| Conversational Multimedia Application | | | |
|---|---|---|---|
| Speech | Video | Text | RTCP |
| Payload formats | | | |
| RTP | | | |
| UDP | | | |
| IP | | | |

FIG. 5

| CMR | ToC | Compressed Media | Padding Bits |
|-----|-----|------------------|--------------|

| RTP Header | |

Figure 15:
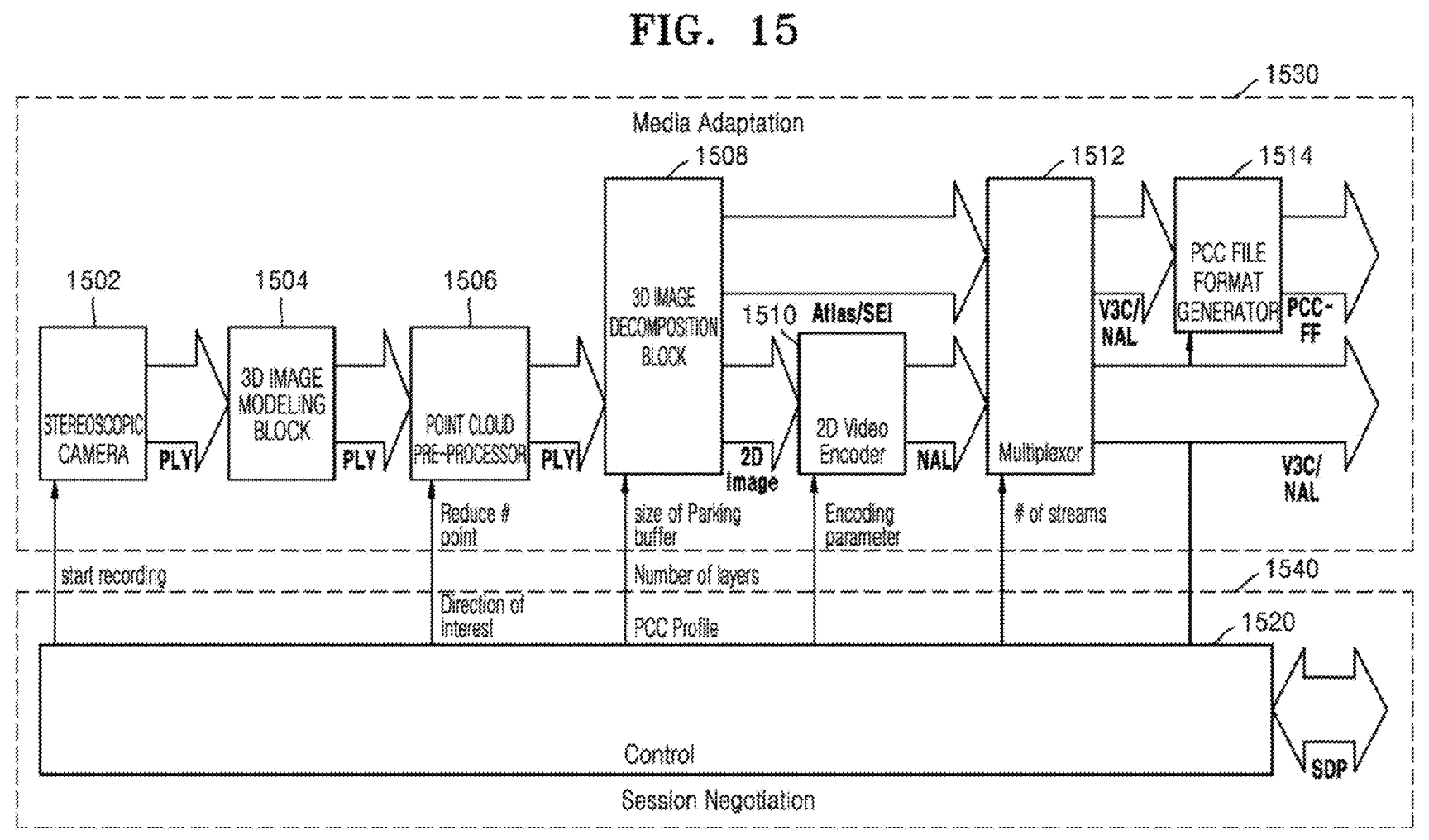

Media Adaptation 1530

1502 STEREOSCOPIC CAMERA — PLY 1504 3D IMAGE MODELING BLOCK — PLY

1506 POINT CLOUD PRE-PROCESSOR — PLY 1508 3D IMAGE DECOMPOSITION BLOCK 1510 2D Video Encoder — NAL Atlas/SEI 2D Image 1512 Multiplexer — V3C/NAL

1514 PCC FILE FORMAT GENERATOR — PCC-FF

V3C/NAL # of streams

1520 Control

Session Negotiation — SDP

1540 start recording

Reduce # point

Direction of interest

Size of Parsing buffer

Number of layers

PCC Profile

Encoding parameter

FIG. 20A
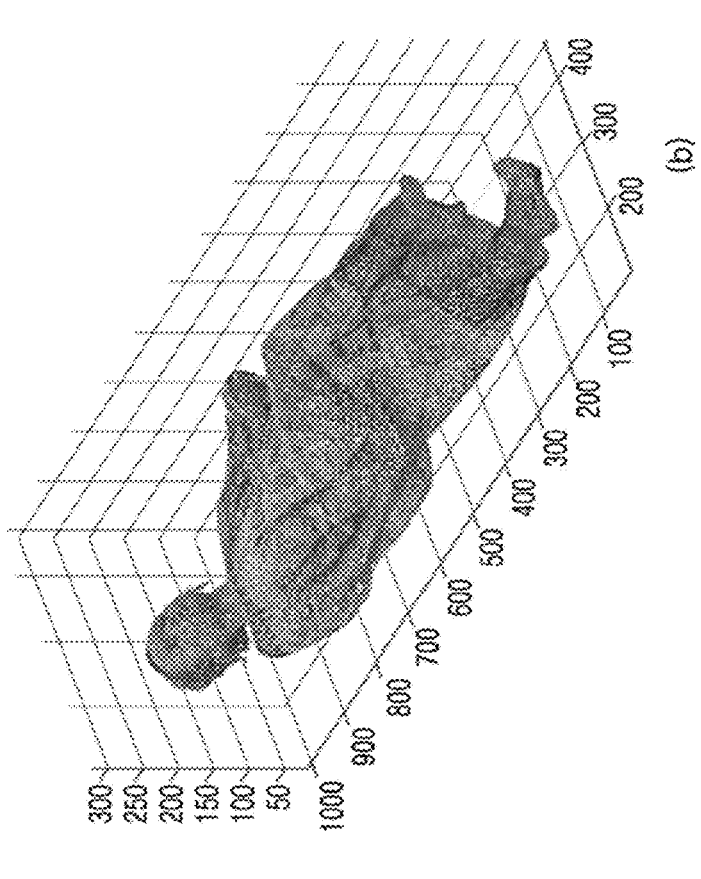
(b)
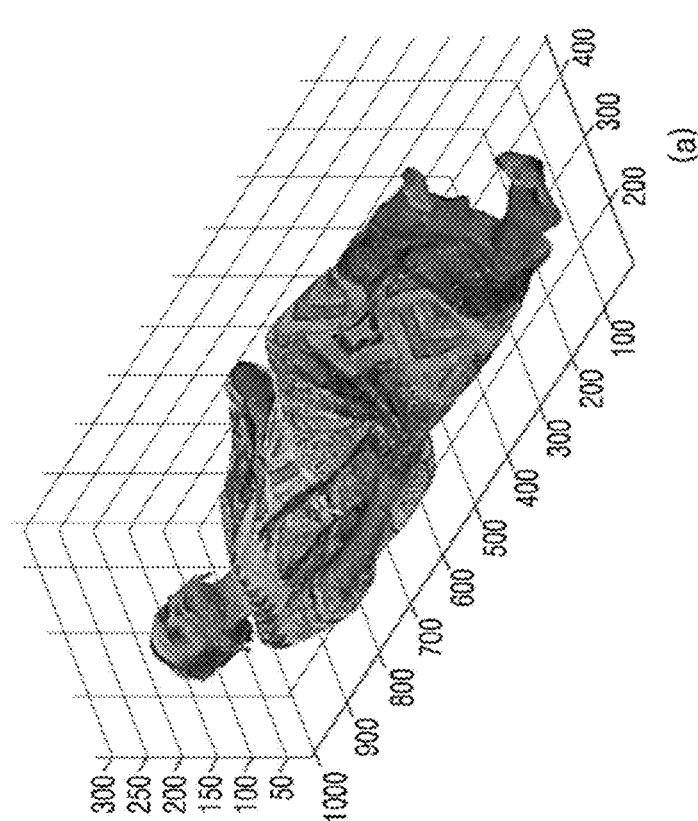
(a)

FIG. 21

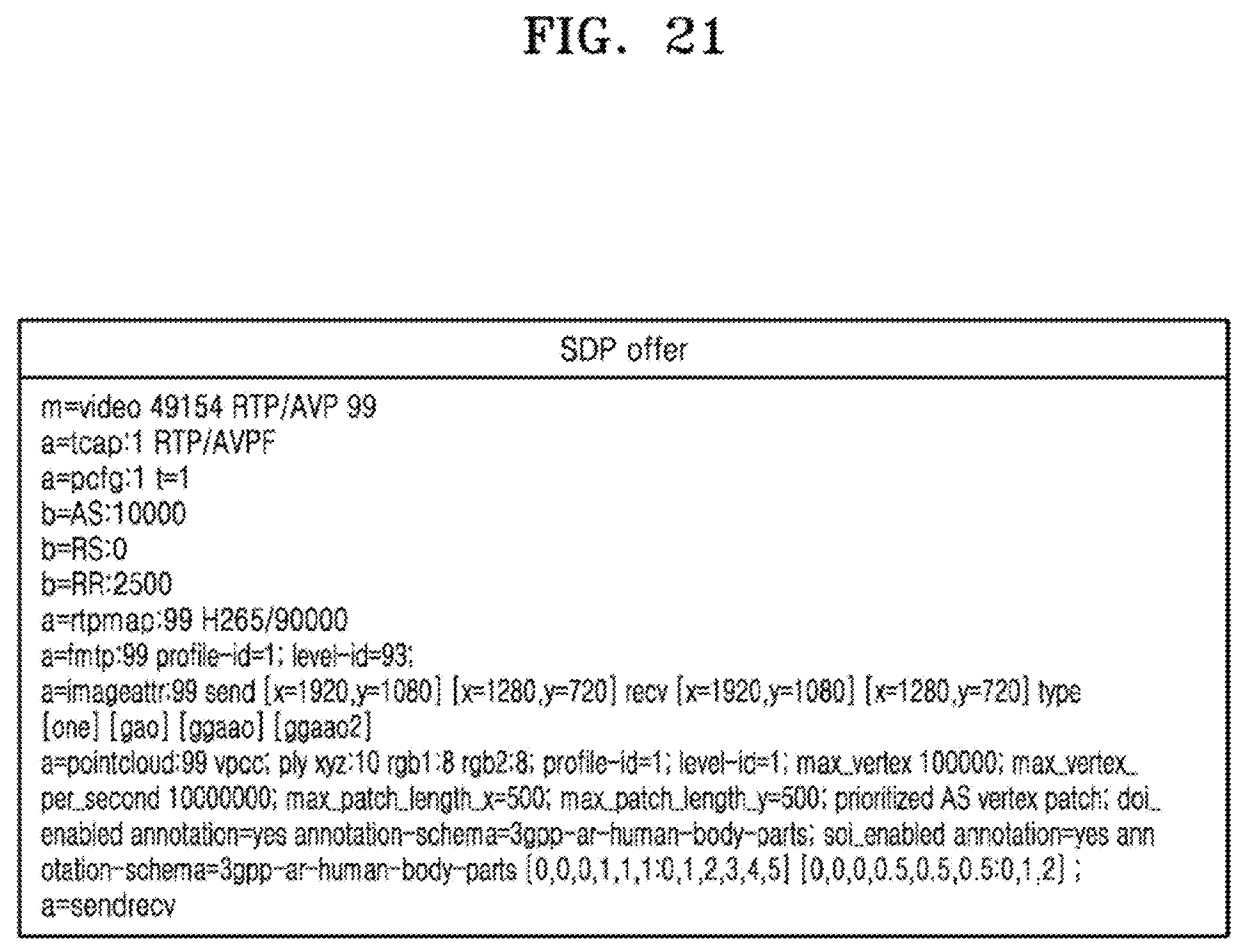

| SDP offer |
| --- |
| m=video 49154 RTP/AVP 99<br>a=tcap:1 RTP/AVPF<br>a=pcfg:1 t=1<br>b=AS:10000<br>b=RS:0<br>b=RR:2500<br>a=rtpmap:99 H265/90000<br>a=fmtp:99 profile-id=1; level-id=93;<br>a=imageattr:99 send [x=1920,y=1080] [x=1280,y=720] recv [x=1920,y=1080] [x=1280,y=720] type<br>[one] [gao] [ggao] [ggao2]<br>a=pointcloud:99 vpcc: ply xyz:10 rgb1:8 rgb2:8; profile-id=1; level-id=1; max_vertex 100000; max_vertex_<br>per_second 10000000; max_patch_length_x=500; max_patch_length_y=500; prioritized AS vertex patch: doi_<br>enabled annotation=yes annotation-schema=3gpp-ar-human-body-parts; soi_enabled annotation=yes ann<br>otation-schema=3gpp-ar-human-body-parts [0,0,0,1,1,10,1,2,3,4,5] [0,0,0,0.5,0.5,0,1,2] ;<br>a=sendrecv |

FIG. 22

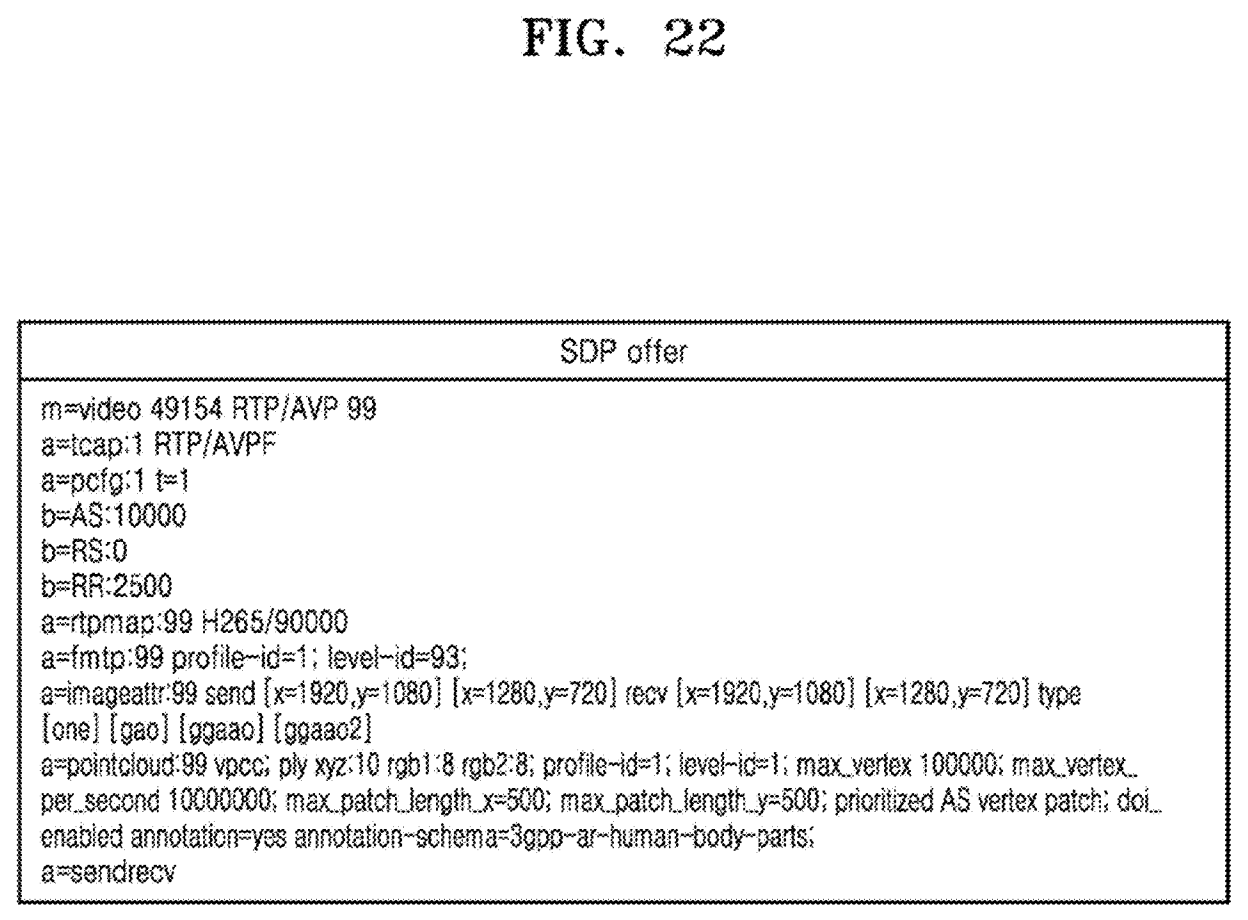

| SDP offer |
|---|
| m=video 49154 RTP/AVP 99<br>a=tcap:1 RTP/AVPF<br>a=pcfg1 t=1<br>b=AS:10000<br>b=RS:0<br>b=RR:2500<br>a=rtpmap:99 H265/90000<br>a=fmtp:99 profile-id=1; level-id=93;<br>a=imageattr:99 send [x=1920,y=1080] [x=1280,y=720] recv [x=1920,y=1080] [x=1280,y=720] type<br>[one] [gao] [ggaao] [ggaao2]<br>a=pointcloud:99 vpcc; ply xyz:10 rgb1:8 rgb2:8; profile-id=1; level-id=1; max_vertex 100000; max_vertex<br>per_second 10000000; max_patch_length_x=500; max_patch_length_y=500; prioritized AS vertex patch; doi<br>enabled annotation=yes annotation-schema=3gpp-ar-human-body-parts;<br>a=sendrecv |

FIG. 23

| SDP offer |
| --- |
| m=video 49154 RTP/AVP 99<br>a=tcap:1 RTP/AVPF<br>a=pcfg:1 t=1<br>b=AS:10000<br>b=RS:0<br>b=RR:2500<br>a=rtpmap:99 H265/90000<br>a=fmtp:99 profile-id=1; level-id=93;<br>a=imageattr:99 send [x=1920,y=1080] [x=1280,y=720] recv [x=1920,y=1080] [x=1280,y=720]<br>a=pointcloud:99 vpcc; ply xyz rgb; profile-id=1; level-id=1; max_vertex 10000; max_patch_length_x=500;<br>max_patch_length_y=500; prioritized AS vertex patch; dol_enabled<br>a=sendrecv |

FIG. 24

| SDP answer |
| --- |
| m=video 49154 RTP/AVP 99<br>a=tcap:1 RTP/AVPF<br>a=pcfg:1 t=1<br>b=AS:10000<br>b=RS:0<br>b=RR:2500<br>a=rtpmap:99 H265/90000<br>a=fmtp:99 profile-id=1; level-id=93;<br>a=imageattr:99 send [x=1280,y=720] recv [x=1280,y=720]<br>a=pointcloud:99 vpcc; ply xyz rgb; profile-id=1; level-id=1; max_vertex 60000; max_patch_length_x=500;<br>max_patch_length_y=500; doLenabled<br>a=recvonly |

FIG. 27

| V | P | Subtype | PT | Length |
|---|---|---------|----|--------|
| | | | SSRC of Packet Source | |
| | | | SSRC of Media Source | |
| | | | Maximum Number of Points | |

FIG. 28

| V | P | Subtype | PT | Length |
|---|---|---------|----|--------|
| SSRC of Packet Source | | | | |
| SSRC of Media Source | | | | |
| Reserved | | | Maximum Proportion of Represented Surface | |

FIG. 29

| V | P | Subtype | PT | Length |
|---|---|---------|-----|-------------------------------------|
| SSRC of Packet Source ||||||
| SSRC of Media Source ||||||
| Reserved ||| Minimum Proportion of Represented Surface ||

FIG. 30A

| V | P | Subtype | PT | Length | | |
|---|---|---------|----|--------|---|---|
| SSRC of Packet Source | | | | | | |
| SSRC of Media Source | | | | | | |
| X | | Y | Z | TX | TY | TZ |
| Reserved | | | | Sequence Number | | |

FIG. 30B

| V | P | Subtype | PT | Length | | | |
|---|---|---------|----|--------|--|--|--|
| SSRC of Packet Source | | | | | | | |
| SSRC of Media Source | | | | | | | |
| X | Y | Z | TX | TY | TZ | W | |
| Reserved | | | | Sequence Number | | | |

FIG. 32A

| V | P | Subtype | PT | Length | | |
|---|---|---------|----|--------|---|---|
| | | | SSRC of Packet Source | | | |
| | | | SSRC of Media Source | | | |
| R | +/- | X | Y | Z | TX | TY | TZ |
| | Reserved | | | Sequence Number | | |
| Annotation-length | | | Annotation value | | | |

FIG. 32B

| V | P | Subtype | PT | Length | | | |
|---|---|---------|----|--------|--|--|--|
| SSRC of Packet Source | | | | | | | |
| SSRC of Media Source | | | | | | | |
| R | +/- | X | Y | Z | TX | TY | TZ |
| Reserved | | | Sequence Number | | | | |
| Annotation-schema | | Annotation value | | | | | |

FIG. 33A

| V | P | Subtype | PT | Length |
|---|---|---------|-----|--------|
| | | | SSRC of Packet Source | |
| | | | SSRC of Media Source | |
| | | Annotation-schema | | Annotation value |

FIG. 33B

| V | P | Subtype | PT | Length |
|---|---|---------|----|----|
| | | SSRC of Packet Source | | |
| | | SSRC of Media Source | | |
| Interest_type | | Annotation values | | |

FIG. 34

| 3GPP-AR-Human-Body-Parts Schema |
| --- |
| 3GPP-AR-HUMAN-BODY-PARTS = { "Head": 0, "Neck": 1, "RShoulder": 2, "RElbow": 3, "RWrist": 4, "LShoulder": 5, "LElbow": 6, "LWrist": 7, "RHip": 8, "RKnee": 9, "RAnkle": 10, "LHip": 11, "LKnee": 12, "LAnkle": 13, "Chest": 14, "Background": 15 } |

FIG. 35

```
ply
format ascii 1.0
comment Version 2, Copyright 2017, 8i Labs, Inc.
comment frame_to_world_scale 0.179523
comment frame_to_world_translation -45.2095
7.18301 -54.3561
comment width 1023
element vertex 775745
property float x
property float y
property float z
property uchar red
property uchar green
property uchar blue
end_header
214 63 59 136 107 81
215 63 58 140 113 88
215 63 59 137 110 84
213 63 60 134 104 76
213 63 61 131 101 74
212 63 62 130 98 69
212 63 63 129 97 67
213 62 62 126 98 72
213 62 63 124 96 69
```

METHOD AND DEVICE FOR CONTROLLING TRANSMISSION OR RECEPTION OF DATA IN WIRELESS COMMUNICATION SYSTEM

PRIORITY

This application is a National Phase Entry of PCT International Application No. PCT/KR2021/008015, which was filed on Jun. 25, 2021, and claims priority to Korean Patent Application No. 10-2020-0079527, which was filed on Jun. 29, 2020, the entire content of which is incorporated herein by reference.

TECHNICAL FIELD

The present disclosure relates to a method and device for controlling transmission or reception of data in a wireless communication system.

BACKGROUND ART

In order to meet increasing demand with respect wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. Also, in order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and received-interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the lot technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

As various services can be provided due to the aforementioned development of wireless communication systems, there is a demand for a method for seamlessly providing the services.

DISCLOSURE

Technical Solution

Based on discussions described above, the present disclosure provides a device and method for effectively controlling transmission or reception of data in a wireless communication system.

DESCRIPTION OF DRAWINGS

FIG. 4 illustrates architecture of a speech or video codec, and real-time transport protocol (RTP)/user datagram protocol (UDP)/Internet protocol (IP) protocol of a user equipment (UE) that supports voice over LTE (VoLTE).

FIG. 5 illustrates a structure of a codec mode request (CMR) message.

FIG. 12 illustrates a procedure for generating a bitstream by using a patch of a point cloud.

FIG. 15 illustrates a block diagram for transmission of a point cloud according to an embodiment of the present disclosure.

FIG. 20A illustrates an example in which a point cloud is illustrated in a 3D space.

FIG. 21 illustrates an example of a transmission message of a transmission UE which is generated based on a space parameter according to an embodiment of the present disclosure FIG. 22 illustrates an example of a transmission message of a transmission UE according to an embodiment of the present disclosure.

FIG. 23 illustrates an example of a transmission message of a transmission UE according to an embodiment of the present disclosure.

FIG. 24 illustrates an example of a response message to a transmission message of a transmission UE according to an embodiment of the present disclosure.

FIG. 27 illustrates an example of metadata transmitted from a reception UE to a transmission UE according to an embodiment of the present disclosure.

FIG. 28 illustrates an example of metadata transmitted from a reception UE to a transmission UE according to an embodiment of the present disclosure.

FIG. 29 illustrates an example of metadata transmitted from a reception UE to a transmission UE according to an embodiment of the present disclosure.

FIG. 30A illustrates an example of metadata transmitted from a reception UE to a transmission UE according to an embodiment of the present disclosure.

FIG. 30B illustrates an example of metadata transmitted from a reception UE to a transmission UE according to an embodiment of the present disclosure.

FIG. 32A illustrates an example in which a transmission UE provides an annotation to a reception UE according to an embodiment of the present disclosure.

FIG. 32B illustrates an example in which a transmission UE provides an annotation to a reception UE according to an embodiment of the present disclosure.

FIG. 33A illustrates an example in which a reception UE provides a transmission UE with a response corresponding to an annotation according to an embodiment of the present disclosure.

FIG. 33B illustrates an example in which a reception UE provides a transmission UE with a response corresponding to an annotation according to an embodiment of the present disclosure.

FIG. 34 illustrates an example of a method of indicating, via an annotation, a body part of human in a 3D image according to an embodiment of the present disclosure.

FIG. 35 illustrates an example of a polygon file format (PLY) format of a point cloud according to an embodiment of the present disclosure.

BEST MODE

Figure 1:
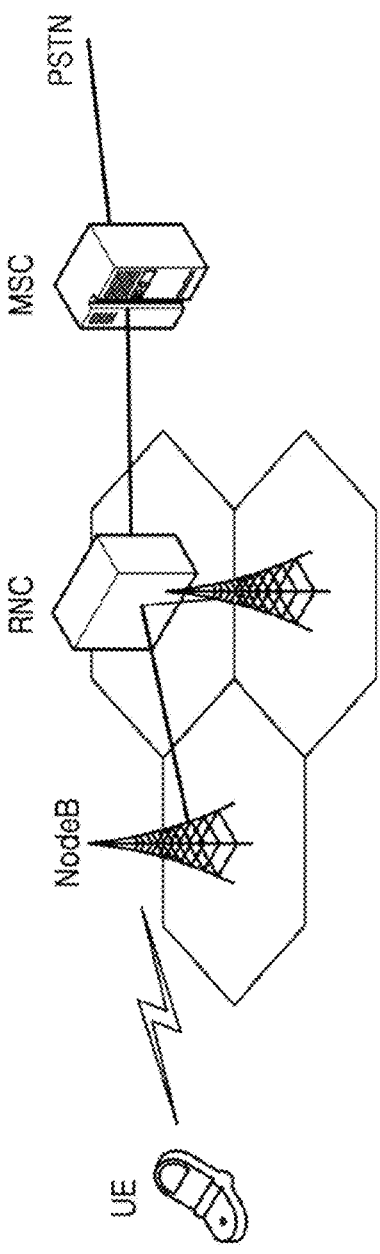
FIG. 1 illustrates an example of a network structure of a $3^{rd}$ generation (3G) communication network.

According to an embodiment of the present disclosure, an operating method of a transmission user equipment (UE) in a wireless communication system may include obtaining a point cloud by photographing an object, transmitting, to a reception UE, a message including a parameter for transmission and reception of the point cloud, wherein the parameter for transmission and reception of the point cloud includes at least one of a parameter associated with a direction of the object or a space parameter associated with the object, receiving, from the reception UE, a response message including an application parameter of the reception UE, wherein the application parameter of the reception UE is determined based on the parameter for transmission and reception of the point cloud and a channel state of the reception UE, compressing the point cloud, based on the application parameter of the reception UE, and transmitting, to the reception UE, the compressed point cloud.

According to an embodiment of the present disclosure, an operating method of a reception UE in a wireless communication system may include receiving, from a transmission UE, a message including a parameter for transmission and reception of a point cloud, and obtaining the point cloud by photographing an object, wherein the parameter for transmission and reception of the point cloud includes at least one of a parameter associated with a direction of the object or a space parameter associated with the object, determining an application parameter of the reception UE, based on a channel state of the reception UE and the parameter for transmission and reception of the point cloud, transmitting, to the transmission UE, a response message including the determined application parameter of the reception UE, receiving, from the transmission UE, the point cloud, wherein the point cloud is compressed based on the application parameter of the reception UE, and displaying an image associated with the object, based on the compressed point cloud.

According to an embodiment of the present disclosure, a transmission UE in a wireless communication system may include a transceiver, and at least one processor configured to obtain a point cloud by photographing an object, transmit, to a reception UE via the transceiver, a message including a parameter for transmission and reception of the point cloud, wherein the parameter for transmission and reception of the point cloud includes at least one of a parameter associated with a direction of the object or a space parameter associated with the object, receive, from the reception UE via the transceiver, a response message including an application parameter of the reception UE, wherein the application parameter of the reception UE is determined based on the parameter for transmission and reception of the point cloud and a channel state of the reception UE, compress the point cloud, based on the application parameter of the reception UE, and transmit, to the reception UE via the transceiver, the compressed point cloud.

According to an embodiment of the present disclosure, a reception UE in a configured to receive, from a transmission UE via the transceiver, a message including a parameter for transmission and reception of a point cloud, and obtain the point cloud by photographing an object, wherein the parameter for transmission and reception of the point cloud includes at least one of a parameter associated with a direction of the object or a space parameter associated with the object, determine an application parameter of the reception UE, based on a channel state of the reception UE and the parameter for transmission and reception of the point cloud, transmit, to the transmission UE via the transceiver, a response message including the determined application parameter of the reception UE, receive, from the transmission UE via the transceiver, the point cloud, wherein the point cloud is compressed based on the application parameter of the reception UE, and display an image associated with the object, based on the compressed point cloud.

MODE FOR INVENTION

Hereinafter, embodiments of the present disclosure will now be described more fully with reference to the accompanying drawings. In the descriptions of the present disclosure, detailed explanations of the related art are omitted when it is deemed that they may unnecessarily obscure the essence of the present disclosure. The terms used in the specification are defined in consideration of functions used in the present disclosure, and can be changed according to the intent or commonly used methods of users or operators. Accordingly, definitions of the terms are understood based on the entire descriptions of the present specification.

Advantages and features of the present disclosure and methods of accomplishing the same may be understood more readily by reference to the following detailed descriptions of embodiments and accompanying drawings of the present disclosure. However, the present disclosure may be embodied in many different forms and should not be construed as being limited to the embodiments set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals refer to like elements.

Here, it will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block may represent a module, segment, or portion of code, which includes one or more executable instructions for performing specified logical function(s). Also, it should be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Here, the term " . . . unit" as used in the present embodiment refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, according to an embodiment, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the elements and " . . . units" may be combined into fewer elements and " . . . units" or further separated into additional elements and " . . . units" Further, the elements and " . . . units" may be implemented to operate one or more central processing units (CPUs) in a device or a secure multimedia card. Also, according to embodiments, a " . . . unit" may include one or more processors.

In the description of the present disclosure, detailed descriptions of the related art are omitted when it is deemed that they may unnecessarily obscure the essence of the present disclosure. Hereinafter, embodiments the present disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the present disclosure is not limited to terms to be described below, and other terms indicating objects having equal technical meanings may be used.

In the descriptions below, "physical channel" and "signal" may be interchangeably used with "data" or "control signal." For example, a physical downlink shared channel (PDSCH) is a term indicating a physical channel on which data is transmitted from a base station to a terminal. However, the PDSCH may also be referred to as the data. That is, in the present disclosure, the expression "transmit a physical channel" may be equally interpreted as the expression "transmit data or a signal on a physical channel".

Hereinafter, in the present disclosure, higher layer signaling indicates a signal transmission scheme by which a base station transmits a signal to a terminal by using a downlink (DL) data channel of a physical layer or a terminal transmits a signal to a base station by using an uplink (UL) data channel of a physical layer. Higher layer signaling may be understood as radio resource control (RRC) signaling or media access control (MAC) control element (CE), or the like.

For convenience of descriptions, the present disclosure uses terms and names defined in the $3^{rd}$ Generation Partnership Project (3GPP) New Radio (NR). However, the present disclosure is not limited to these terms and names, and may be equally applied to systems conforming to other standards. In the present disclosure, a next-generation node B (gNB) that is a base station of NR may be interchangeably used with an evolved node B (eNB) that is a base station of long term evolution (LTE), for convenience of descriptions. That is, a base station described by an eNB may represent a gNB. Also, the term "terminals" may refer to not only mobile phones, machine type communication (MTC) devices, narrowband Internet of Things (NB-IoT) devices, and sensors but also other wireless communication devices.

Hereinafter, a base station is an entity that allocates resources to a terminal, and may be at least one of a gNode B (gNB), an eNode B (eNB), a Node B, a base station (BS), a radio access unit, a BS controller, or a node on a network. A terminal may include a user equipment (UE), a mobile station (MS), a cellular phone, a smartphone, a computer, or a multimedia system capable of performing a communication function. However, the present disclosure is not limited to the above example.

The $2^{nd}$ generation (2G) network such as the Global System for Mobile Communications (GSM), Interim Standard 95 (IS-95), or the like which could provide a basic service such as a voice call and a short message service (SMS) has evolved, according to the developments of mobile communication technologies, to the $3^{rd}$ generation (3G) network such as Wideband Code-Division Multiple Access (W-CDMA), cdma2000, or the like which can provide a video call service, and in the $4^{th}$ generation (4G) network such as LTE, a large amount of data and image with high quality can be transmitted with high speed. In the $5^{th}$ generation (5G) network using the NR wireless communication technology, the use of the point cloud compression technology is being considered to transmit a three-dimensional (3D) stereoscopic image. The present disclosure relates to a device and method for applying the point cloud compression technology to the 5G network in a situation where a transmission condition of a network deteriorates or the network is heavily overloaded.

Mobile communication networks may have a limited transmission capacity due to physically limited radio frequency resources and the long time and huge investment costs required to build various wired or wireless infrastructures. However, many UEs in a dense area may simultaneously make connections to a mobile communication network to use call services or Internet or attempt to download data or use media streaming services. Here, when the capacity of the network is insufficient, UEs may not be able to properly use such services.

This network overload such as the insufficient network capacity described above may occur at rush hour in big cities or in an event where many people are gathered in a narrow space. When call traffic sharply increases, a radio network controller (RNC) for controlling BSs in a circuit-switched 3G (e.g., Wideband Code Division Multiple Access (W-CDMA)) network decreases bitrates of speech codecs equipped in UEs and the network so as to overcome communication disorder caused by the network overload. The speech bitrate, which has been temporarily reduced, of each UE may be gradually increased when the network has sufficient capacity.

FIG. 1 illustrates an example of a network structure of a $3^{rd}$ generation (3G) communication network. In detail, FIG. 1 illustrates the structure of the 3G network including a UE, a BS (e.g., NodeB), a radio network controller (RNC), and a mobile switching center (MSC).

Referring to FIG. 1, the network of FIG. 1 is connected to another mobile communication network and a public switched telephone network (PSTN). In the 3G network, speech may be compressed and reconstructed by adaptive multi-rate (AMR) codecs. Here, the AMR codecs are installed in the UE and the MSC and provide bidirectional call services. The MSC may convert the speech compressed by the AMR codec to a pulse-code modulation (PCM) format and transmit the speech to the PSTN, or inversely, may receive a speech with PCM format, may compress the speech by the AMR codec, and then may transmit it to a BS. The RNC may always control call bitrates of the speech codecs installed in the UE and the MSC, using a codec mode control (CMC) message.

However, after introduction of a packet switched network in the 4G, the speech codec is only installed in the UE, and a speech frame compressed at intervals of 20 ms may not be reconstructed by a BS or a network node located in the middle of a transmission path but may be transmitted to and reconstructed by the other UE. In the present disclosure, the other UE may indicate a UE that transmits or receives data with a particular UE or that performs video call.

Figure 2:
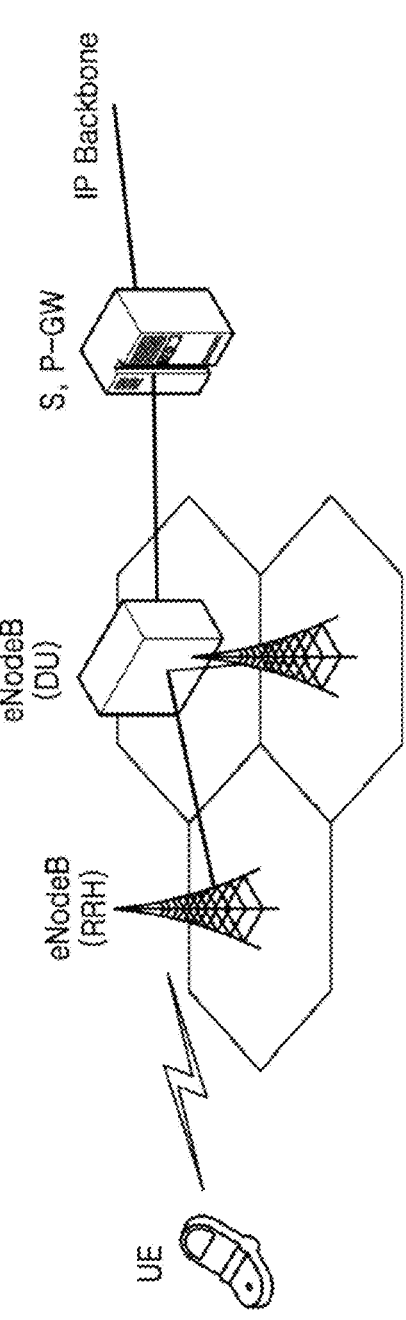
FIG. 2 illustrates an example of a network structure of a long term evolution (LTE) communication system.

FIG. 2 illustrates an example of a network structure of a LTE communication system.

Referring to FIG. 2, the network structure of 4G (i.e., LTE) is illustrated. Here, a speech codec is installed only in a UE, and each UE may adjust a speech bitrate of the other UE by using a codec mode request (CMR) message. In FIG. 2, an eNodeB that is a BS may be divided into a remote radio head (RRH) in charge of a radio frequency (RF) function and a digital unit (DU) in charge of digital signal processing of a modem. The eNodeB may be connected to an Internet Protocol (IP) backbone network via a serving gateway (S-GW) and a packet data network gateway (P-GW). The IP backbone network may be connected to a mobile communication network of another service provider or Internet.

Figure 3:
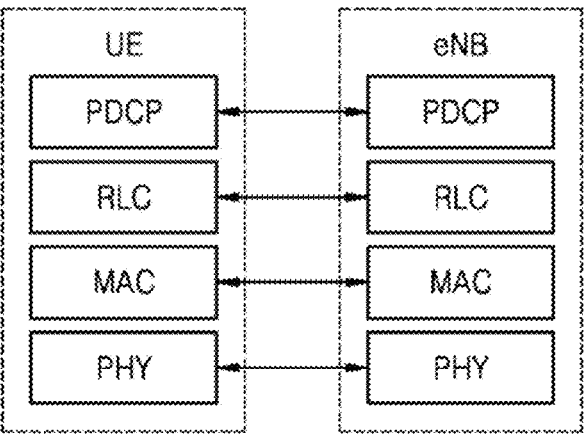
FIG. 3 illustrates user plane (UP) protocol architecture of a LTE modem.

FIG. 3 illustrates user plane (UP) protocol architecture of a LTE modem.

Referring to FIG. 3, illustrated is the UP protocol architecture of the LTE modem which is used to transmit a compressed speech or video frame in the Voice over LTE (VoLTE) using an LTE network. The protocol structure of FIG. 3 consists of packet data convergence protocol (PDCP), radio link control (RLC), media access control (MAC) and physical (PHY) layers.

Figure 4:
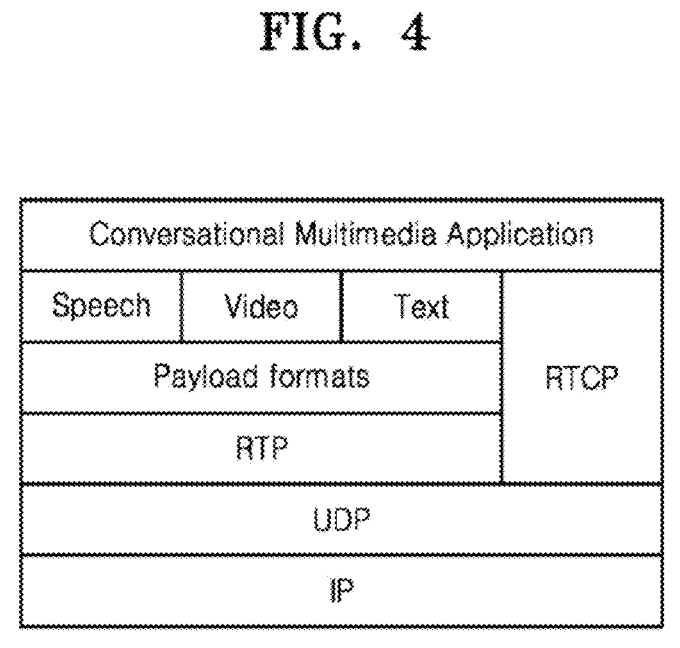

FIG. 4 illustrates architecture of a speech or video codec, and real-time transport protocol (RTP)/user datagram protocol (UDP)/Internet protocol (IP) protocol of UE that supports VoLTE.

An IP layer located at the bottom of the protocol architecture of FIG. 4 may be connected to the PDCP at the top of the protocol architecture shown in FIG. 3. RTP/UDP/IP headers may be added to a media frame compressed by the speech or video codec and may be transmitted to the other UE via the LTE network. Also, the UE may receive, via the network, a media packet compressed and transmitted by the other UE, may reconstruct the media, and thus, a user of the UE may listen and view the media with a speaker and a display. Here, even when a speech and a video packet which are simultaneously captured and compressed are not received in the same time, the UE may synchronize two media by using timestamp information of an RTP protocol header, and thus, the user may listen and view them.

When the UE is located at a boundary with a neighboring cell or when the UE experiences poor transmission or it is predicted that the UE is to experience poor transmission due to a huge amount of data transmission and reception within a cell, the eNodeB may mark a congestion experienced (CE) state in an IP header of a packet being transmitted or received to or from the UE, by using an explicit congestion notification (ECN) function, or may display a currently-available bitrate on a control entity (CE) of a MAC header. The UE may identify a change in a transmission state, based on information such as the CE state or the available bitrate.

Figure 5:
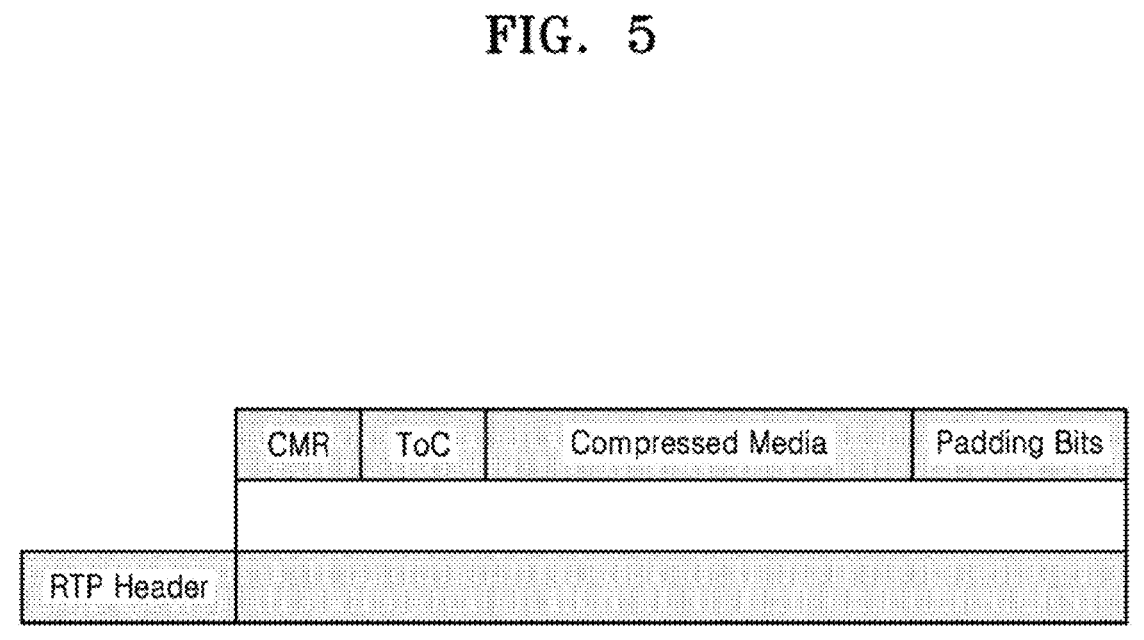

FIG. 5 illustrates a structure of a CMR message.

Referring to FIG. 5, illustrated is the CMR message by which the other UE adjusts a bitrate for compressing a speech, according to a change in a transmission state during call between a UE and the other UE. FIG. 5 may correspond to payload formats of FIG. 4. A speech frame coded by a speech codec displayed "Speech" in FIG. 4 may be added a CMR field to display a bitrate requested for a speech codec of the other UE to use. A four-bit table of contents (ToC) field is added thereto and compressed, such that a bitrate and a type of a frame to be transmitted may be indicated. The VoLTE may support speech codes including adaptive multi-rate (AMR), adaptive multi-rate wideband (AMR-WB), enhanced voice services (EVS), and the like.

Figure 6:
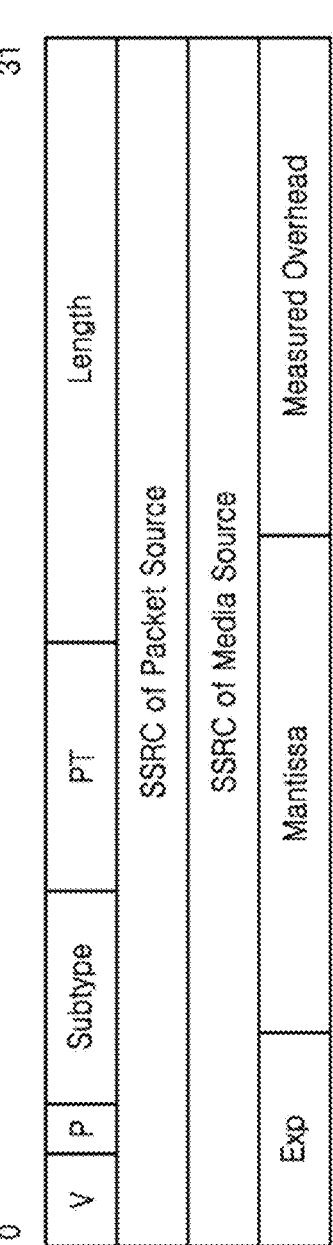
FIG. 6 illustrates a structure of a temporary maximum media bit-rate request (TMMBR) message.

FIG. 6 illustrates a structure of a temporary maximum media bit-rate request (TMMBR) message.

A CMR message may be transmitted via an RTP protocol (RTCP) as well as payload formats. FIG. 6 illustrates the structure of the TMMBR message that is included and transmitted in during call so as to dynamically adjust a bitrate of a video codec installed in the other UE. When the other UE receives the TMMBR message, the other UE may maintain a bitrate of a compressed video at $\mathrm{Mantissa} \times 2^{Exp}$ bps or less. Here, the bitrate of the compressed video may be equal to or smaller than a bitrate negotiated before a video call starts.

Figure 7:
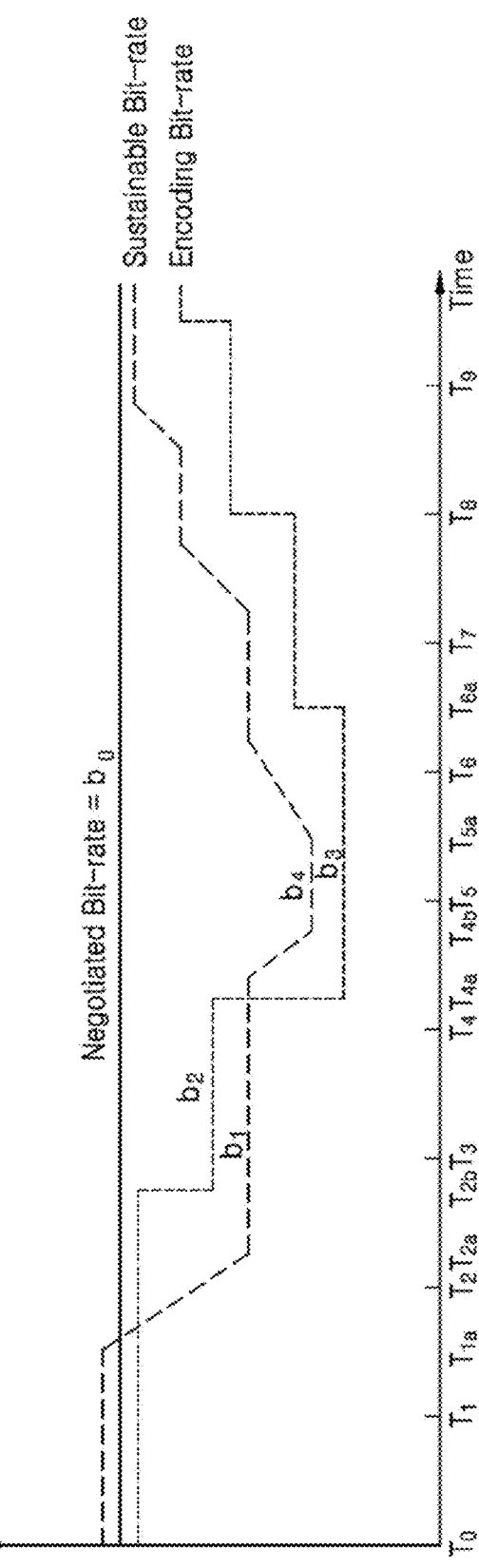
FIG. 7 illustrates an example in which a media bitrate of a video or a speech transmitted by the other UE is adjusted by using a control message.

FIG. 7 illustrates an example in which a media bitrate of a video or a speech transmitted by the other UE is adjusted by using a control message.

Referring to FIG. 7, illustrated is the example in which a UE adjusts during call a media bitrate of a video or a speech transmitted by the other UE, by using a control message such as CMR or TMMBR. Primary parameters including a codec type, a media bitrate, and the like which are used in call may be negotiated between the UE and a network by using an IP Multimedia Subsystem (IMS). In the example of FIG. 7, it is negotiated such that the UE is to compress a media at $b_0$ (kbps) and transmit it. FIG. 7 shows a sustainable bitrate the network can maintain, and an encoding bitrate the reception UE can adjust.

Referring to the graph of FIG. 7, on the time axis, call started at $T_0$, and a change state deteriorated from $T_{1a}$, such that a sustainable bitrate was decreased. When the media reception UE detects that $b_0$ (kbps) which was negotiated between UEs via the IMS before the start of call is not maintained after the start of call, the media reception UE may determine that a channel state deteriorates. The media reception UE may transmit a CMR or TMMBR message to the other UE, thereby decreasing a media bitrate to $b_2$. However, when a reception state continuously deteriorates, the media reception UE may decrease again a media bitrate of the other UE to $b_3$. When a channel state is recovered, the media reception UE may gradually increase a bitrate. $b_1$ and $b_4$ and $T_{2b}$ and $T_{4b}$ are bitrates at which the network is sustainable and are parameters that cannot be accurately measured by media transmission and reception UEs or the network. When the channel state keeps deteriorating, the UE may determine to stop media transmission and reception. As such, in compression and transmission of a one-dimensional (1D) media signal such as a speech and a three-dimensional (3D) media signal such as a video, the UE may react to a change in a network state by adjusting a bitrate of the other UE.

Figure 8:
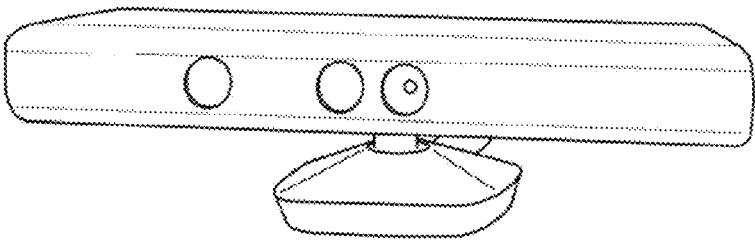
FIG. 8 illustrates an example of a camera for measuring a point cloud.

FIG. 8 illustrates an example of a camera for measuring a point cloud.

Figure 9:
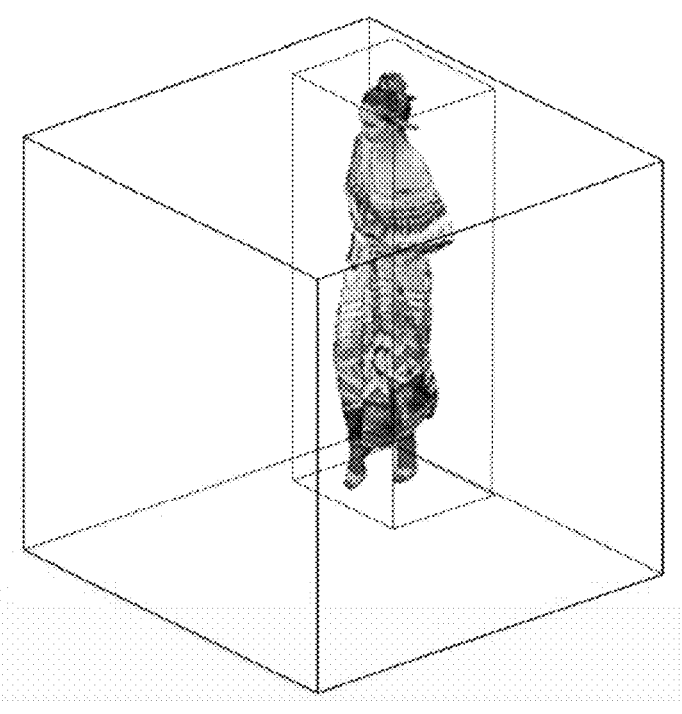
FIG. 9 illustrates an example of displaying a point cloud in a three-dimensional (3D) space.

Referring to FIG. 8, illustrated is the example of the camera that is usable to measure a point cloud that is a set of points visibly configuring a surface of human or an object. At least one camera may be arranged around the human or the object, and the camera may obtain Red (R), Green (G). Blue (B) values and location (X, Y, Z) information which indicate a relative location and color information of each point of the surface of the human or the object, and thus, may generate a point cloud. For example, the camera that is usable to measure a point cloud may include a pattern output unit configured to output a pattern for recognizing a distance to human or an object, a pattern receiver configured to identify a shape of the human or the object, based on the output pattern, and an RGB camera configured to identify a color of a surface of the human or the object. However, the camera to obtain a point cloud in the present disclosure is not limited to the example of FIG. 8. A scheme for storing a point cloud structure based on R, G, B values and location information includes a polygon file format (PLY). FIG. 9 illustrates a point cloud of human measured by using the scheme, in a 3D space.

FIG. 9 illustrates an example of displaying a point cloud in a 3D space.

FIG. 9 illustrates an example of storing a point cloud structure based on R, G, B values and location information by using a PLY scheme. In FIG. 9, the point cloud of human which is measured by using the PLY scheme is displayed in a 3D space. For example, as a bitrate consumed to obtain 1,000,000 points 30 times per second is about 1.80 Gbps ((3 attributes+3 coordinations)*10 bits*1,000,000 points*30 frames) which significantly exceeds the range in which the mobile communication network can economically provide, it is required to transmit points by compressing the points to several Mbps not greatly affecting an image quality or to store the points in a hard disk.

Figure 10:
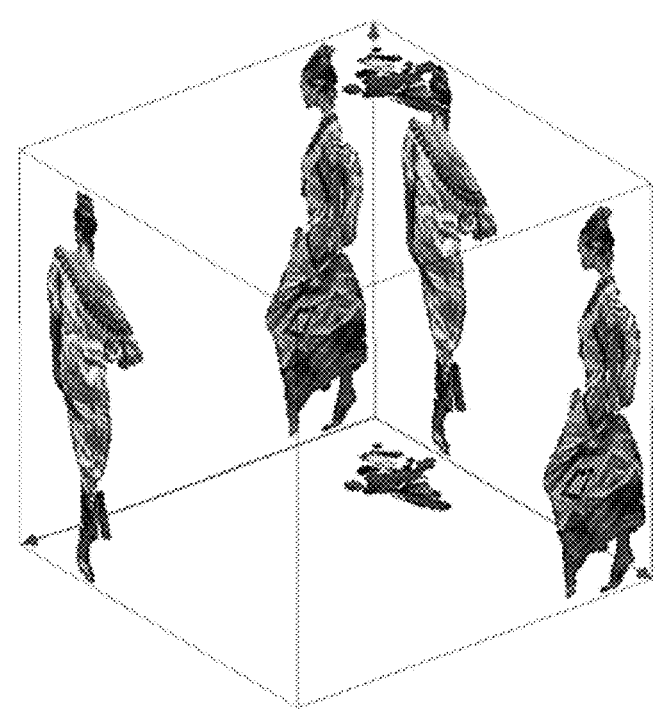
FIG. 10 illustrates an example of generating a patch of a point cloud.

FIG. 10 illustrates an example of generating a patch of a point cloud.

The example of FIG. 10 illustrates a procedure for generating a patch, as a first step to compress the point cloud shown in FIG. 9. For example, a hexahedron of a minimum size that can include all of point clouds of a human shape shown in FIG. 9 may be assumed to be around the human shape. Then, color information of each point of a surface of a human shape projected onto each surface of the hexahedron, and a distance or depth between each point and an inner surface of the hexahedron may be measured. Here, each point may be projected onto only one surface of the hexahedron. Via the procedure described above, points may be grouped on one surface of the hexahedron, and such grouped points may be referred to as a patch. According to an embodiment, at least one patch may be generated on each inner surface of the hexahedron. With respect to one inner surface of the hexahedron which surrounds the human shape, patches including color information and patches including distance information may each be generated.

Figure 11:
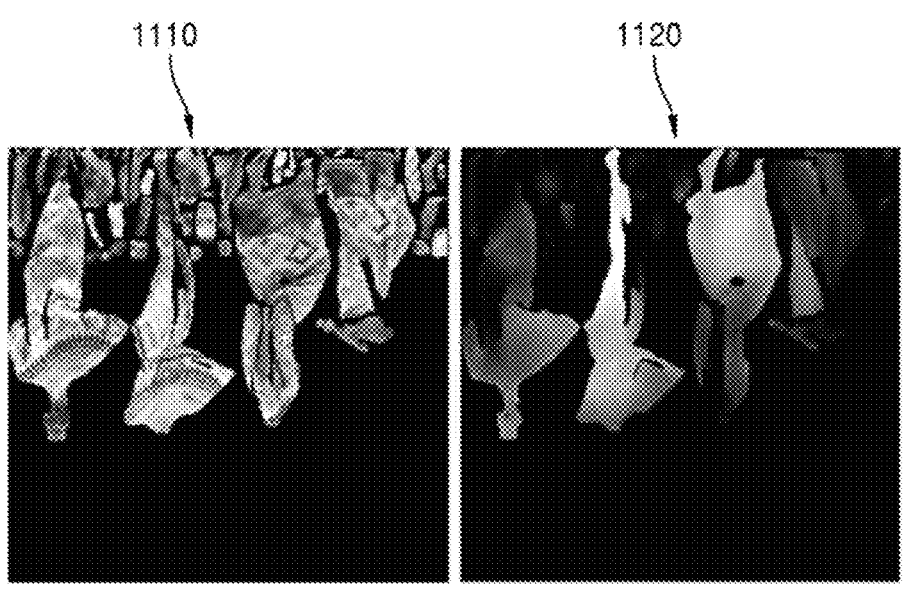
FIG. 11 illustrates an example of a color information patch and a distance information patch.

FIG. 11 illustrates an example of a color information patch and a distance information patch.

In detail, FIG. 11 illustrates a procedure for compacting, in a still image, color information patches and distance information patches for easy transmission or storage. Each of still images may be compressed by a video compressor such as H.265 or the like, and thus, a bitrate may be further decreased. Here, patches may be maximally compacted to be located on one part of a still image. This is to increase an efficiency of the video compressor by maximally using a space of the still image. FIG. 11 illustrates a still image 1110 in which the color information patches are compacted, and a still image 1120 in which the distance information patches are compacted. In the still image 1110 where the color information patches are compacted, color patches respectively indicating R, G, B values may be arranged. In the still image 1120 where the distance information patches are compacted, patches indicating distance information may be arranged. Here, as a distance between the human shape and an inner surface of the hexahedron on which the human shape is projected is close, the brightness of a distance information patch may be dimmed.

Figure 12:
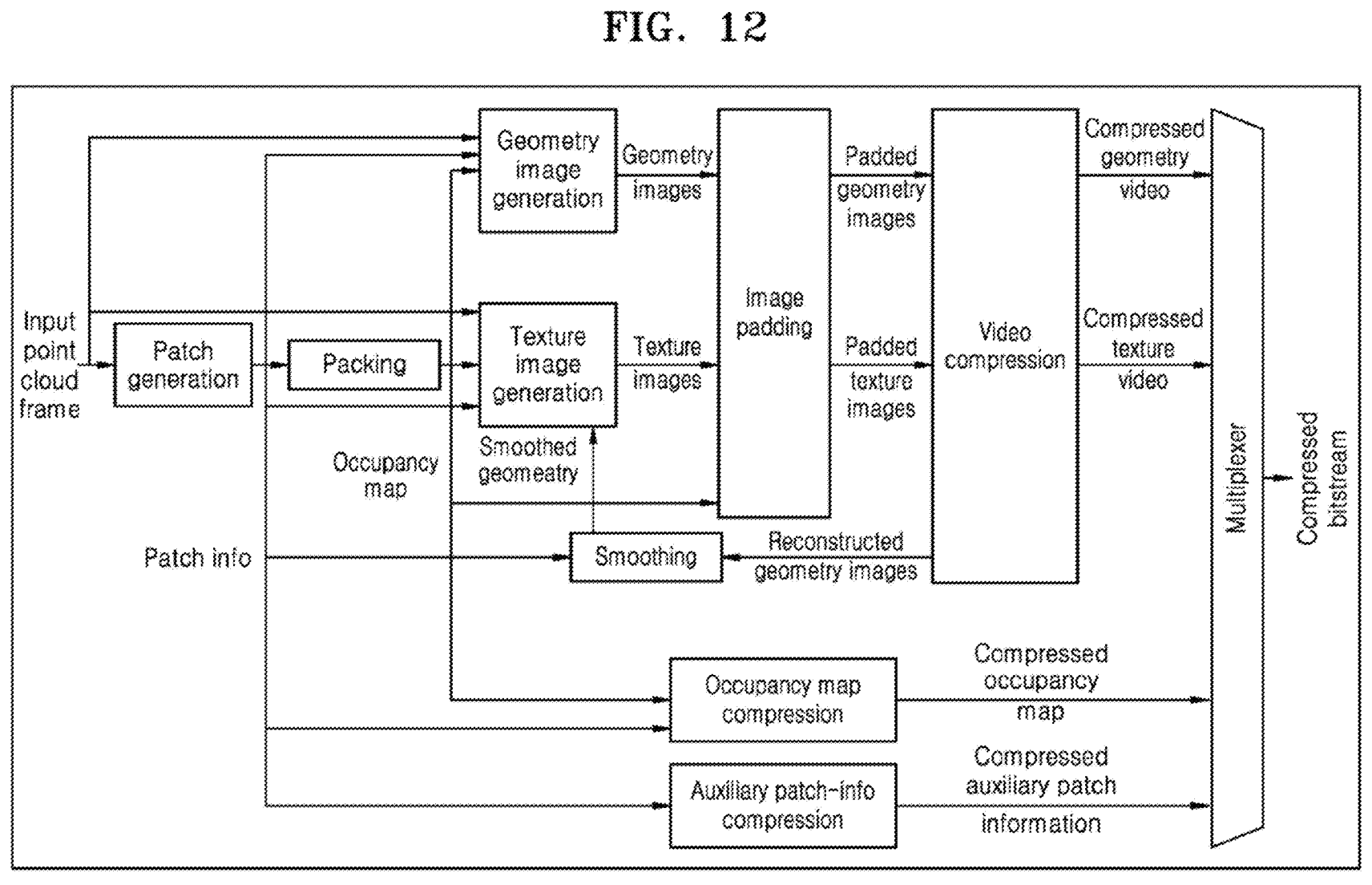

FIG. 12 illustrates a procedure for generating a bitstream by using a patch of a point cloud.

Referring to FIG. 12, patches compressed with reference to FIGS. 10 and 11 and a plurality of pieces of additional information for reconstructing the compressed patches in a 3D space may be multiplexed to generate a compressed bitstream. Then, the generated bitstream may be used in transmission and storage of the point cloud.

Figure 13:
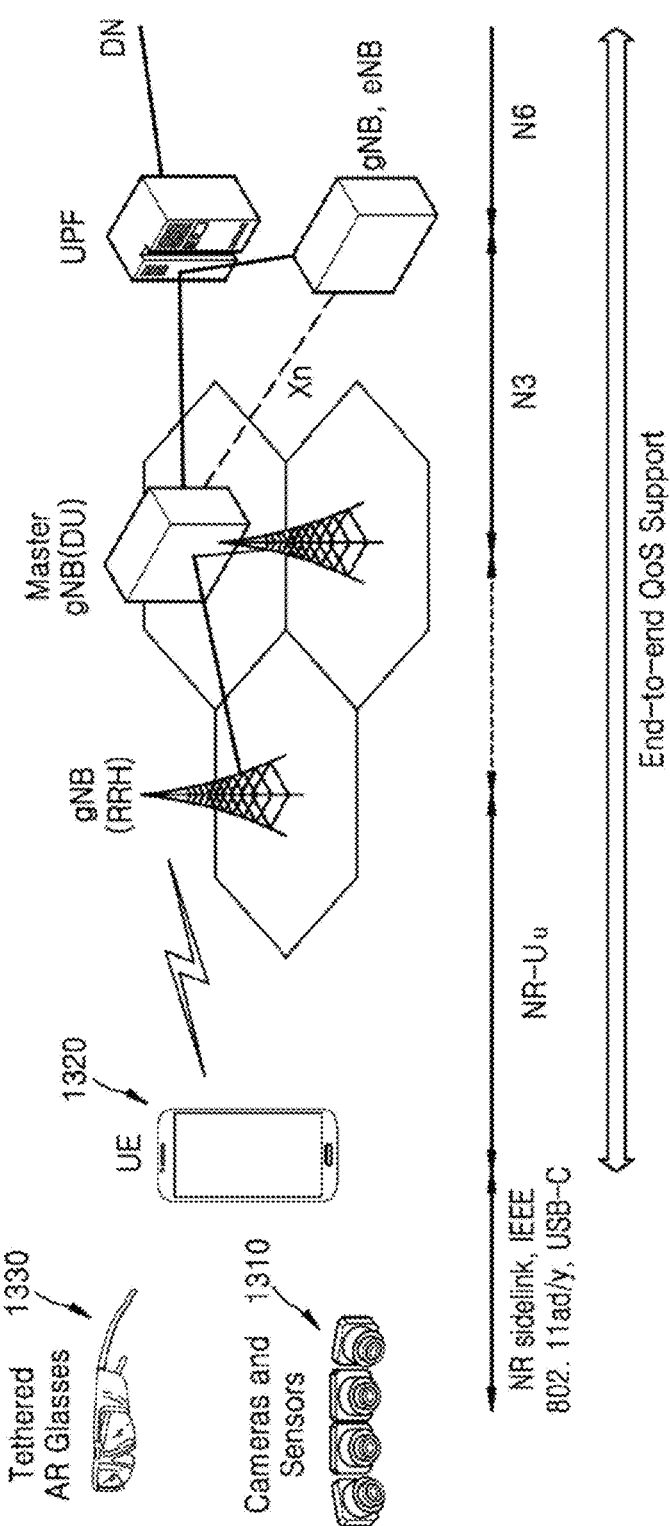
FIG. 13 illustrates a scenario in which a point cloud is transmitted by using a 5th generation (5G) network according to an embodiment of the present disclosure.

FIG. 13 illustrates a scenario in which a point cloud is transmitted by using a 5G network according to an embodiment of the present disclosure. That is, FIG. 13 illustrates a situation in which the generated point cloud is transmitted by using the 5G network.

Referring to FIG. 13, an eNodeB, an S-GW and a P-GW of the LTE may respectively correspond to a gNB, a user plane function (UPF) and a data network (DN) of the 5G. FIG. 13 illustrates cameras and sensors 1310, a UE 1320, and a tethered augmented reality (AR) glasses 1330.

Figure 14:
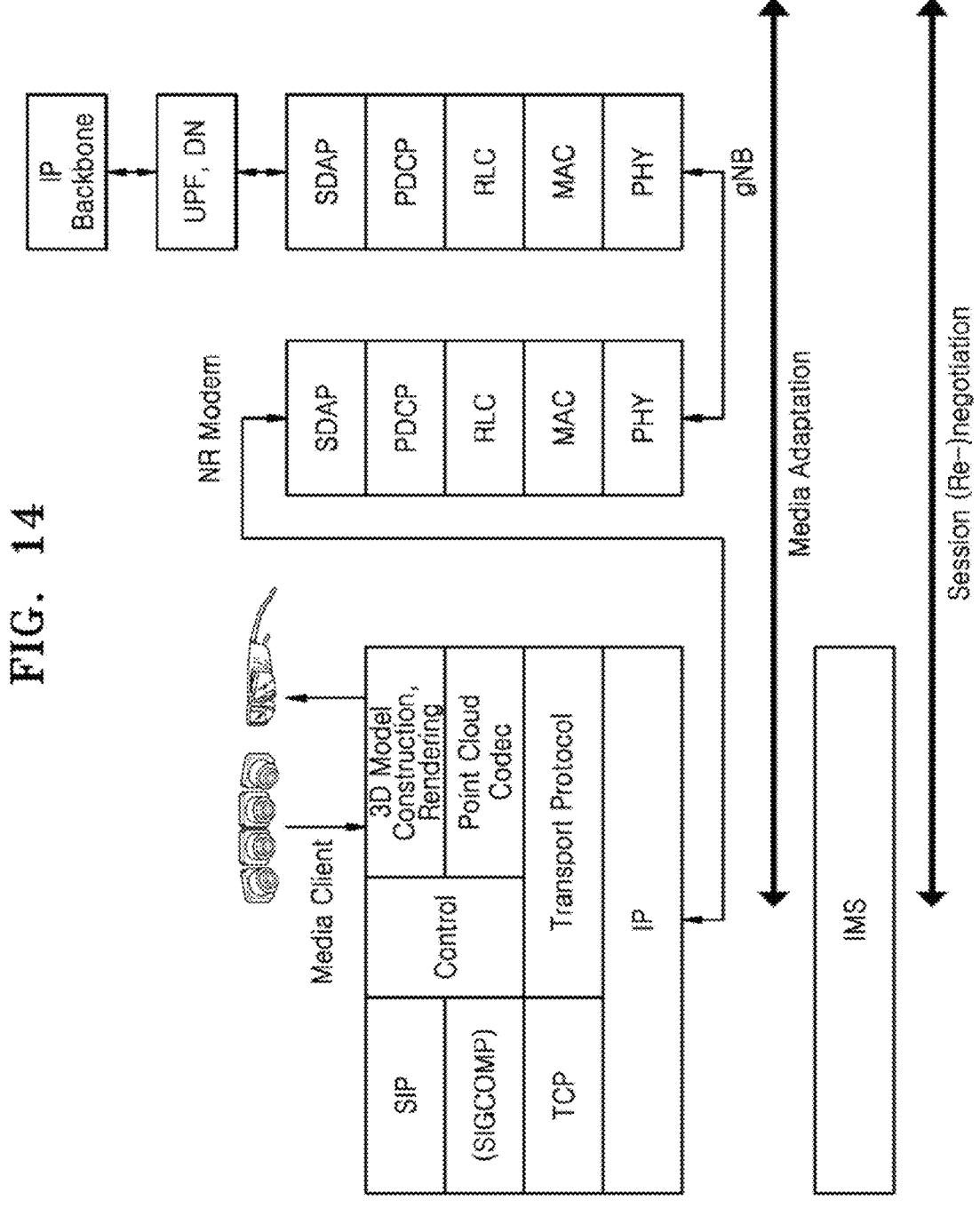
FIG. 14 illustrates the protocol architecture for point cloud transmission or reception according to an embodiment of the present disclosure.

According to an embodiment, a point cloud that is measured by the cameras and sensors 1310 and is compressed via the procedure of FIG. 12 may be transmitted to the UE 1320 via the LTE using a unlicensed spectrum without via a BS (e.g., gNB), a sidelink of the 5G, or Wi-Fi Direct or may be directly transmitted to the UE 1320 by using a universal serial bus (USB)-C cable. When the USB-C is used, a large number of data can be transmitted at a low bitrate without an error, and thus, in this case, the point cloud may be compressed by the UE 1320, not by the cameras and sensors 1310. The UE may transmit the received point cloud to the AR glasses 1330. The AR glasses 1330 may output an AR image of an object photographed by using the cameras and sensors 1310, based on the point cloud received from the UE 1320. FIG. 14 to be described illustrates protocol architecture of the 5G network for the UE 1320 to transmit the point cloud to the AR glasses 1330, the point cloud being received from the cameras and sensors 1310.

FIG. 14 illustrates the protocol architecture for point cloud transmission or reception according to an embodiment of the present disclosure.

Referring to FIG. 14, a point cloud photographed by cameras may be converted into a PLY format or the like via 3D model construction. Then, the point cloud may be compressed by a point cloud codec (encoder), may have attached thereto a header of a transport protocol such as RTP and a header of an IP including an address of a reception UE, and may be transferred to a 5G NR modem, and then may be transmitted to the reception UE. In an embodiment, the NR modem may include a new protocol called a service data adaptation protocol (SDAP) as an upper layer of a PDCP, unlike the protocol architecture of the LTE modem shown in FIG. 3.

The reception UE may reconstruct a payload, which is obtained by removing the headers of the protocols, to a point cloud format such as PLY by using point cloud codec (decoder), may perform rendering by considering a field of view (FOV) of a user of the reception UE, and then may have the point cloud projected onto a display such as AR glasses connected to the reception UE. In an embodiment, the AR glasses may not be connected to the reception UE but may be directly connected to a mobile communication network by using its own communication function. Alternatively, in an embodiment, the AR glasses may be include in the reception UE.

The present disclosure relates to a method and device for maximally using a limited transmission bandwidth and managing a media quality and network capacity by adjusting primary parameters of devices for generating, compressing, and transmitting a point cloud image on the mobile communication network.

The present disclosure proposes technologies by which the cloud transmission and reception system shown in FIG. 14 is enhanced such that a maximum number of points to be transmitted according to a network-available bandwidth and a display resolution of a reception UE is determined, and a point cloud compression and transmission scheme is dynamically changed between UEs so as to correspond to a change in a transmission or reception situation.

FIG. 15 illustrates a block diagram for transmission of a point cloud according to an embodiment of the present disclosure.

In detail, FIG. 15 particularly illustrates a configuration of blocks, among configurations of FIG. 14, for obtaining a 3D image and generating a point cloud so as to transmit the point cloud. In the present disclosure, a UE, a service, or a server may include one or more stereoscopic cameras 1502 to obtain a 3D image, a 3D image modeling block 1504 to generate an integrated 3D image from one or more 3D images obtained from the stereoscopic cameras, a point cloud pre-processor 1506 to perform filtering or editing on the entirety or a part of a generated image and output a point cloud modified compared to an input, a 3D image decomposition block 1508 to decompose the point cloud into multiple patches on a 3D space and convert the patches into different types of 2D images, a 2D video encoder 1510 to compress an input 2D image, a multiplexor 1512 configured to receive an input of information for patch reconstruction and the compressed 2D image, and a point cloud compression (PCC) file format generator 1514 to store a compressed point cloud image. For example, in the present disclosure, a transmission UE that transmits a 3D image to a reception UE may include the stereoscopic cameras 1502, the 3D image modeling block 1504, the point cloud pre-processor 1506, the 3D image decomposition block 1508, the 2D video encoder 1510, the multiplexor 1512, and the PCC file format generator 1514. Operations performed by the stereoscopic cameras 1502 and the 3D image modeling block 1504 of FIG. 15 may be performed by the 3D model construction of FIG. 14. Also, operations after the point cloud pre-processor 1506 of FIG. 15 may be performed by the point cloud codec (encoder) of FIG. 14.

FIG. 15 illustrates processing blocks for obtaining, compressing, and storing a 3D image, and various embodiments of a configuration of the UE, the service, or the server may be available. For example, in an embodiment of the present disclosure, the stereoscopic cameras 1502 may be implemented as a separate first UE, the 3D image modeling block 1504 may be implemented as a second UE, and configurations starting from the point cloud pre-processor 1506 may be implemented as a third UE.

Alternatively, in another embodiment of the present disclosure, the stereoscopic cameras 1502 and the 3D image modeling block 1504 may be implemented as a first UE, and the configurations starting from the point cloud pre-processor 1506 may be implemented as a second UE.

Alternatively, in another embodiment of the present disclosure, the stereoscopic cameras 1502, the 3D image modeling block 1504, and the point cloud pre-processor 1506 may be implemented as a first UE, and configurations starting from the 3D image decomposition block 1508 may be included in a server.

A negotiation and a re-negotiation between a transmission UE and a reception UE which are to be described with reference to FIGS. 23 to 39 may correspond to a session negotiation 1540 of FIG. 15. Adjustment of an output bitstream to be output to the reception UE according to operation adjustment of each module of FIG. 15, in response to the session negotiation, may correspond to media adaptation 1530 of FIG. 15. In order to adjust an operation of each module, in response to the session negotiation, a control block 1520 of FIG. 15 may transfer information to each module.

Hereinafter, FIGS. 16 to 19 illustrate operation flowcharts of a transmission UE and a reception UE according to the present disclosure.

According to an embodiment of the present disclosure, a scenario may be considered, in which communication (e.g.: data transmission and reception, a voice call or, a video call, or the like) is performed between the transmission UE and the reception UE. In an embodiment, the transmission UE may obtain a point cloud by photographing an object via a camera. According to an embodiment, the object may refer to human or a thing the camera can photograph. In an embodiment, the point cloud may indicate a set of points that visibly configure a surface of the object. In an embodiment, the camera may be present separately from the transmission UE or may be included in the transmission UE. In a case where the camera is present separately from the transmission UE, the camera may be connected to the transmission UE in a wireless manner using an unlicensed spectrum, a sidelink, or Wi-Fi or in a wired manner using a USB-C cable. Then, the point cloud of the object photographed or measured by the camera may be transmitted to the transmission UE in a wired or wireless manner.

According to an embodiment, the transmission UE may process (e.g.: compression) the point cloud, and may transmit the processed point cloud to the reception UE. The reception UE may display an AR image, based on the processed point cloud received from the transmission UE.

Here, the reception UE may display an object image generated based on the point cloud, on an AR device (e.g.: AR glasses, AR display, or the like) included in the reception UE or an AR device existing separately from the reception UE. Here, the image may be a 2D image or a 3D image, and the present disclosure is not limited thereto. In a case where an AR device exists separately from the reception UE, the AR device may be connected to the reception UE in a wireless manner using an unlicensed spectrum, a sidelink, or Wi-Fi or in a wired manner using a USB-C cable. Then, the point cloud processed by the reception UE may be transmitted to the AR device in a wired or wireless manner. In the example above, a virtual reality (VR) device (e.g.: head mount display (HMD)) may be used, instead of the AR device.

The present disclosure relates to a procedure for negotiating, between the transmission UE and the reception UE, information associated with a point cloud so as to adaptively correspond to a situation such as channel state degradation, while the transmission UE transmits the point cloud to the reception UE or when the situation such as channel state degradation occurs before transmission.

According to an embodiment of the present disclosure, for the negotiation described above, the transmission UE may transmit a message to the reception UE. In this regard, the message being transmitted from the transmission UE to the reception UE may be referred to as a session description protocol (SDP) offer message. The SDP offer message may include a parameter for point cloud transmission and reception.

According to an embodiment of the present disclosure, when the reception UE receives the SDP offer message from the transmission UE, the reception UE may transmit a response message to the transmission UE. Here, the message being transmitted from the reception UE to the transmission UE may be referred to as a SDP answer message. The SDP answer message may include an application parameter of the reception UE. In an embodiment, the application parameter of the reception UE may indicate a parameter that is applicable to the reception UE, from among the parameter for point cloud transmission and reception which are transmitted by the transmission UE.

Figure 16:
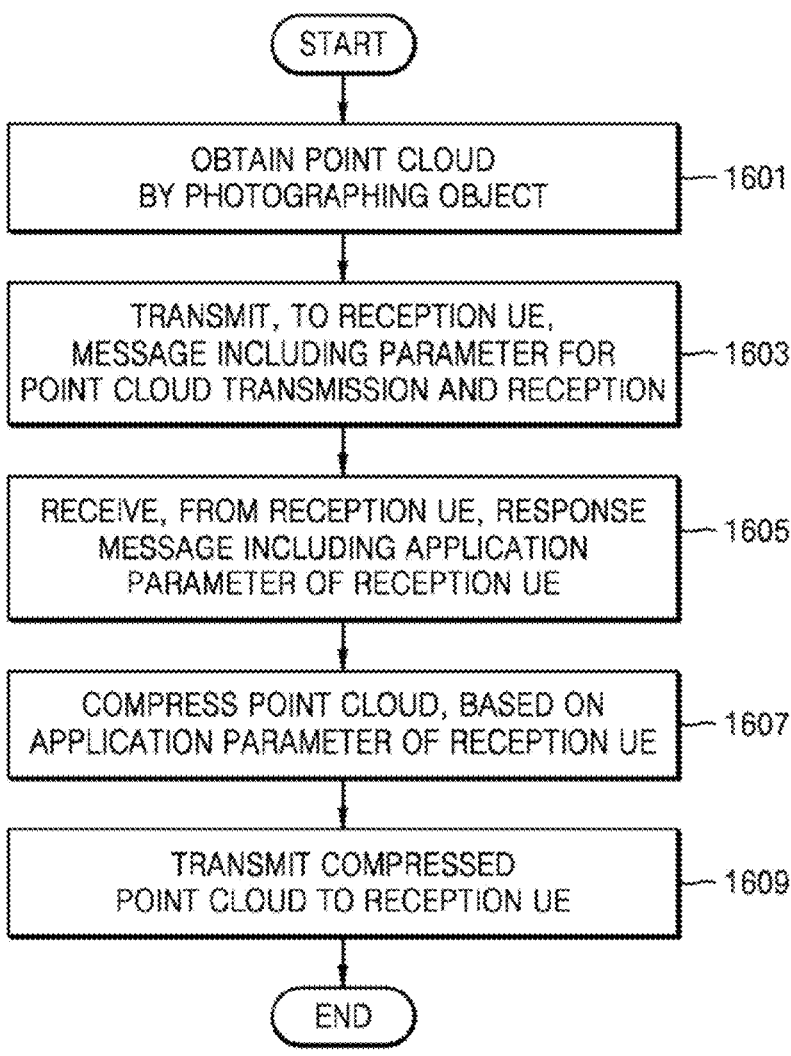
FIG. 16 illustrates a flowchart of an operating method of a transmission UE according to an embodiment of the present disclosure.

FIG. 16 illustrates a flowchart of an operating method of a transmission UE according to an embodiment of the present disclosure.

Referring to FIG. 16, in operation 1601, the transmission UE may obtain a point cloud by photographing an object. For example, the transmission UE may photograph the object such as human or a thing via a camera that is included in the transmission UE or exists separately from the transmission UE. Then, the transmission UE may obtain information about the point cloud of the object.

In operation 1603, the transmission UE may transmit, to the reception UE, a message including a parameter for point cloud transmission and reception. According to an embodiment, the parameter for point cloud transmission and reception may include a parameter associated with a direction of the object, a space parameter associated with the object, or the like. In an embodiment, the parameter associated with a direction of the object may indicate a display direction of the object in an image, when the object is displayed in the image by the reception UE. According to an embodiment, the direction of the object may indicate a direction of interest (DOI) of the reception UE. For example, the DOI of the reception UE may be determined according to an input by a user of the reception UE or a predetermined reference, and the reception UE may display the object in the image, based on the DOI of the reception UE. In an embodiment, a space associated with the object may indicate a space of the image in which the object is displayed, when the object is displayed in the image by the reception UE. For example, when the object is human, an upper body of the human may be determined as the space associated with the object, according to an input by the user of the reception UE or a predetermined reference. Accordingly, the space parameter associated with the object may include information indicating an upper body region of the human.

In operation 1605, the transmission UE may receive, from the reception UE, a response message including an application parameter of the reception UE. In an embodiment, the application parameter of the reception UE may be determined based on a channel state of the reception UE and the parameter for point cloud transmission and reception.

In operation 1607, the transmission UE may compress the point cloud, based on the application parameter of the reception UE. For example, the transmission UE may compress the point cloud so as to transmit the point cloud to the reception UE, based on at least one parameter included in the application parameter of the reception UE.

In operation 1609, the transmission UE may transmit the compressed point cloud to the reception UE. In an embodiment, the transmission UE may transmit the compressed point cloud to the reception UE via NR-U or a slidelink, based on the application parameter of the reception UE.

Figure 17:
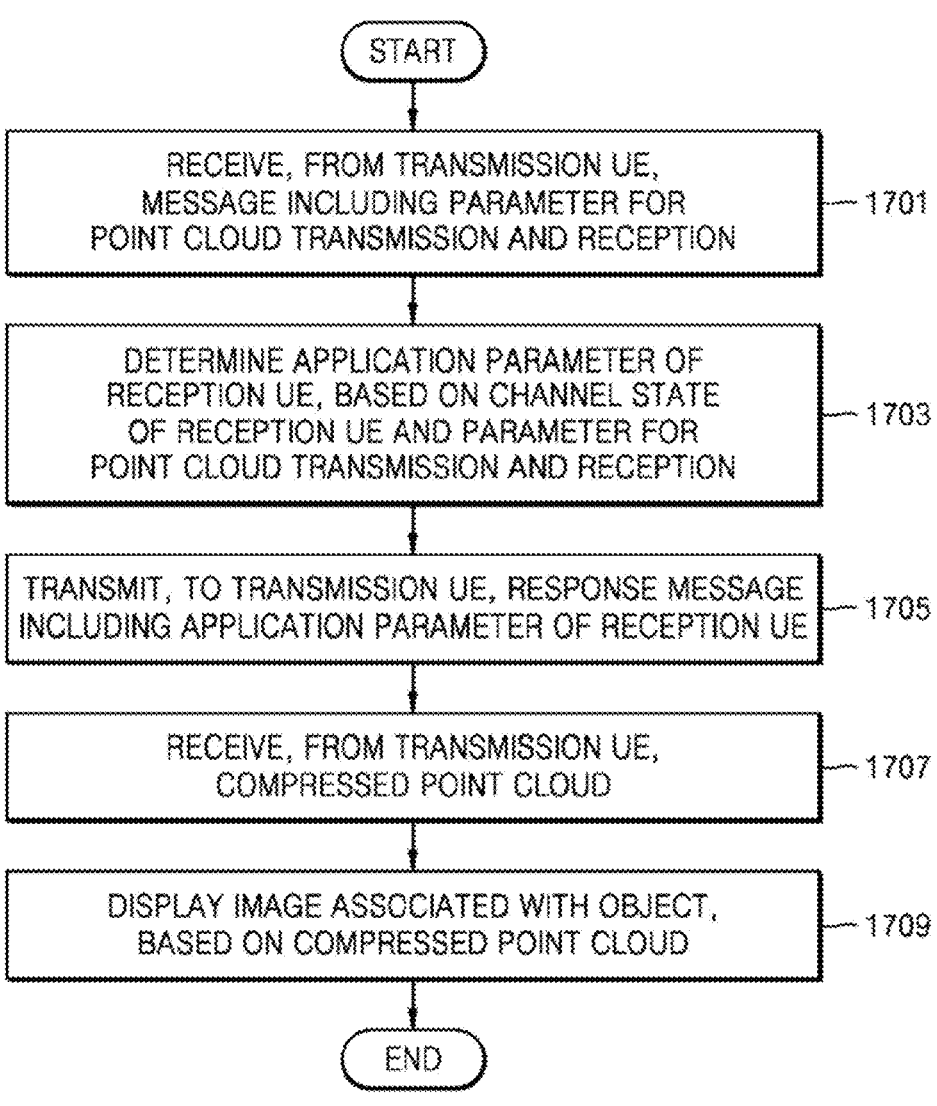
FIG. 17 illustrates a flowchart of an operating method of a reception UE according to an embodiment of the present disclosure.

FIG. 17 illustrates a flowchart of an operating method of a reception UE according to an embodiment of the present disclosure.

Referring to FIG. 17, in operation 1701, the reception UE may receive, from a transmission UE, a message including a parameter for point cloud transmission and reception. According to an embodiment, a point cloud may be obtained by photographing an object. The parameter for point cloud transmission and reception may include at least one of a parameter associated with a direction of the object or a space parameter associated with the object.

In operation 1703, the reception UE may determine an application parameter of the reception UE, based on a channel state of the reception UE and the parameter for point cloud transmission and reception. In an embodiment, the reception UE may identify an indicator indicating whether to use the parameter associated with the direction of the object or an indicator indicating whether to use the space parameter associated with the object. Then, the reception UE may determine the application parameter of the reception UE, based on the channel state of the reception UE, or the like.

In operation 1705, the reception UE may transmit, to the transmission UE, a response message including the application parameter of the reception UE. For example, the reception UE may transmit the response message to the transmission UE by including, in the response message, the application parameter of the reception UE being determined based on the channel state of the reception UE and the parameter for point cloud transmission and reception.

In operation 1707, the reception UE may receive, from the transmission UE, a compressed point cloud. For example, the reception UE may receive, from the transmission UE, the point cloud compressed by the transmission UE based on the application parameter of the reception UE.

In operation 1709, the reception UE may display an image associated with the object, based on the compressed point cloud. For example, the reception UE may display the entirety or a part of the photographed object, on a display being included in the reception UE or existing separately from the reception UE. In an embodiment, the entirety or the part of the photographed object may be displayed in an AR device.

According to an embodiment, the parameter for point cloud transmission and reception may include resolution information of an image buffer associated with compression of a point cloud, type information of the image buffer, count information of the point cloud, transfer rate information of the point cloud, patch size information of the point cloud, information indicating a priority between the count information of the point cloud and the patch size information of the point cloud, or the like.

According to an embodiment, the image buffer associated with compression of the point cloud may indicate a 2D image generated by the point cloud pre-processor 1506 of FIG. 15. Here, the generated 2D image may indicate location information (i.e., geometry information) on a space, color information of point cloud (i.e., attribute information), or information indicating whether it is information for each pixel in a 2D image (e.g., occupancy map information), according to information included in the 2D image among a plurality of pieces of information of a 3D image. That is, the 2D image may be classified into types of the geometry information, the attribute information, the occupancy map information, or the like. The type information of the image buffer may indicate the types of the geometry information, the attribute information, the occupancy map information, or the like. In an embodiment, a resolution of the image buffer may indicate a resolution of a 2D image which corresponds to the image buffer.

In an embodiment, the count information of the point cloud may indicate information about the number of point clouds which can be transmitted from the transmission UE to the reception UE. The transfer rate information of the point cloud may indicate a transfer rate at which the transmission UE can transmit a point cloud to the reception UE. In an embodiment, the transfer rate for the point cloud may be expressed as a bitrate.

In an embodiment, the patch size information of the point cloud may indicate information indicating a size of a patch generated with respect to the point cloud. In an embodiment, the information indicating a priority between the count information of the point cloud and the patch size information of the point cloud may indicate information indicating a priority order of parameters during transmission and reception of the point cloud. For example, when the count information of the point cloud has a higher priority than the patch size information of the point cloud, and the number of point clouds corresponds to a particular condition for transmission and reception of the point cloud, the patch size information of the point cloud may be ignored.

In an embodiment, the reception UE may determine the application parameter of the reception UE which is applicable to the reception UE, from a plurality of pieces of information included in the parameter for point cloud transmission and reception, based on the channel state of the reception UE or a predetermined reference. Then, the reception UE may transmit the application parameter of the reception UE to the transmission UE, and the transmission UE may transmit an optimal point cloud to the reception UE.

Figure 18:
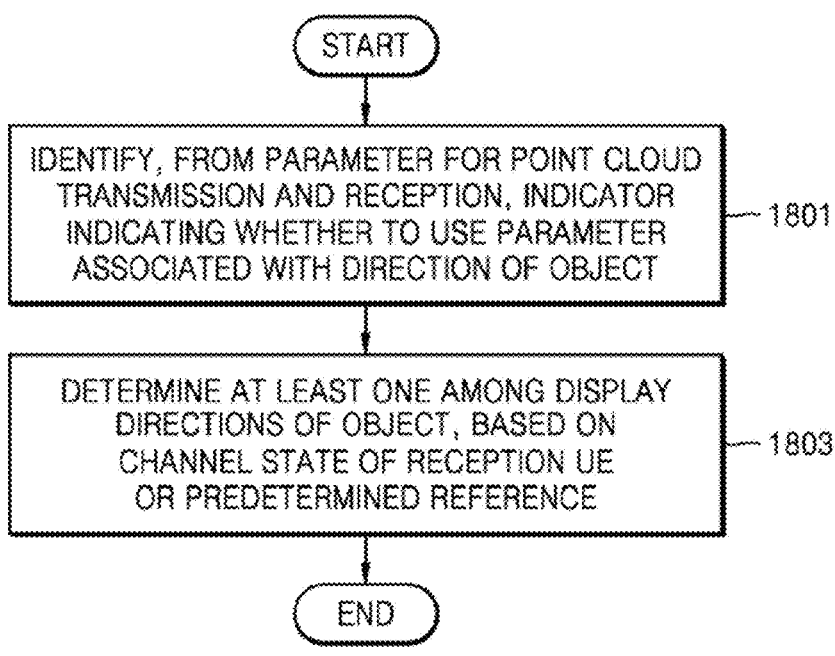
FIG. 18 illustrates a flowchart of a method of determining an application parameter of a reception UE according to an embodiment of the present disclosure.
Figure 19:
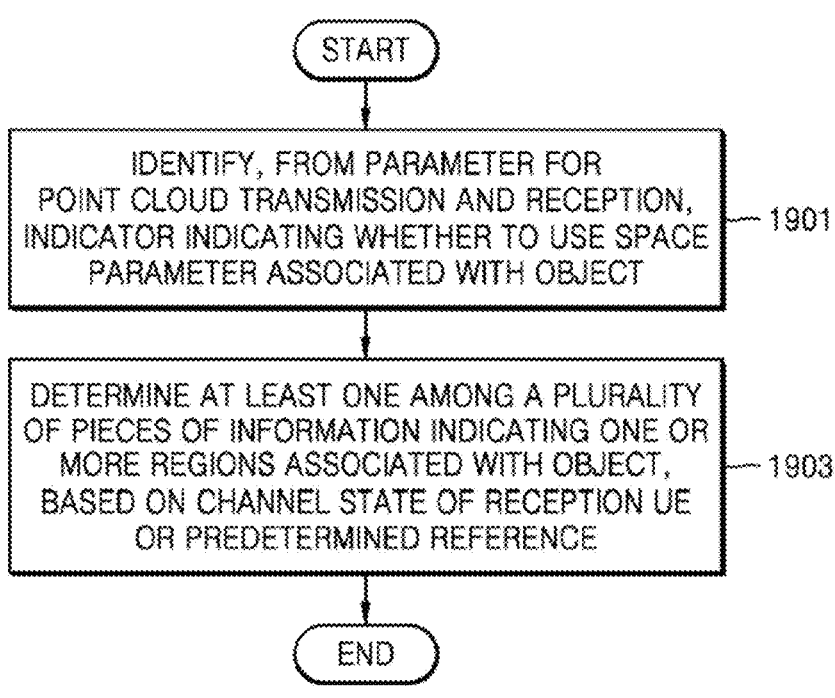
FIG. 19 illustrates a flowchart of a method of determining an application parameter of a reception UE according to an embodiment of the present disclosure.

Hereinafter, FIGS. 18 and 19 illustrate embodiments in which a reception UE determines an application parameter of the reception UE.

FIG. 18 illustrates a flowchart of a method of determining an application parameter of the reception UE according to an embodiment of the present disclosure.

Referring to FIG. 18, in operation 1801, the reception UE may identify, from a parameter for point cloud transmission and reception, an indicator indicating whether to use a parameter associated with a direction of an object. In an embodiment, the parameter for point cloud transmission and reception may include the indicator indicating whether to use the parameter associated with the direction of the object. For example, the indicator may indicate usage or non-usage of the parameter associated with the direction of the object. Alternatively, when the indicator is included in the parameter for point cloud transmission and reception, the reception UE may identify that the parameter associated with the direction of the object is to be used. Alternatively, when the indicator is not included in the parameter for point cloud transmission and reception, the reception UE may identify that the parameter associated with the direction of the object is not to be used. In an embodiment, the indicator that indicates whether to use the parameter associated with the direction of the object may be referred to as doi_enabled.

In operation 1803, the reception UE may determine at least one among display directions of the object, based on a channel state of the reception UE or a predetermined reference. For example, in operation 1801, when usage of the parameter associated with the direction of the object is determined based on the indicator indicating whether to use the parameter associated with the direction of the object, the reception UE may determine at least one among the display directions of the object, based on the channel state of the reception UE or the predetermined reference. Here, information about the display directions of the object may be included in the parameter for point cloud transmission and reception.

In an embodiment, the channel state of the reception UE may include information associated with a state, a bandwidth, and a pathloss of a network including the reception UE or congestion of the network including the reception UE. Also, the predetermined reference that is used to determine at least one among the display directions of the object may indicate information indicating performance of the reception UE capable of processing the point cloud. According to an embodiment, while it is expressed as the predetermined reference, the present disclosure is not limited thereto and may determine or update a corresponding reference when the reception UE requires it. As described above with reference to description of FIG. 19, the reception UE may determine at least one of a plurality of pieces of information indicating one or more regions associated with the object, and may include and transmit the determined information in a response message to the transmission UE.

FIG. 19 illustrates a flowchart of a method of determining an application parameter of a reception UE according to an embodiment of the present disclosure.

Referring to FIG. 19, in operation 1901, the reception UE may identify, from a parameter for point cloud transmission and reception, an indicator indicating whether to use a space parameter associated with an object. In an embodiment, the parameter for point cloud transmission and reception may include the indicator indicating whether to use the space parameter associated with the object. For example, the indicator may indicate usage or non-usage of the space parameter associated with the object. Alternatively, when the indicator is included in the parameter for point cloud transmission and reception, the reception UE may identify that the space parameter associated with the object is to be used. Also, when the indicator is not included in the parameter for point cloud transmission and reception, the reception UE may identify that the space parameter associated with the object is not to be used. In an embodiment, the indicator indicating whether to use the space parameter associated with the object may be referred to as space of interest (soi)_enabled, and details about soi_enabled will be provided below.

According to an embodiment, the space parameter associated with the object may include at least one of information indicating a scheme of segmenting the object into one or more regions or information indicating the one or more regions associated with the object. For example, the information indicating the scheme of segmenting the object into one or more regions may indicate information indicating a scheme of segmenting a human-shape object into a head region, a neck region, a shoulder region, an elbow region, or the like. Also, for example, the information indicating one or more regions associated with the object may indicate information indicating the head region as a value of 0, the neck region as a value of 1, the shoulder region as a value of 2, the elbow region as a value of 3, or the like, based on the information indicating the scheme of segmenting the object into one or more regions. Alternatively, the information indicating one or more regions associated with the object may include information indicating coordinates of a region of the object on a space.

In operation 1903, the reception UE may determine at least one among a plurality of piece of information indicating one or more regions associated with the object, based on a channel state of the reception UE or a predetermined reference. For example, in operation 1901, when usage of the space parameter associated with the object is identified based on the indicator indicating whether to use the space parameter associated with the object, the reception UE may determine at least one of the information indicating one or more regions associated with the object, based on the channel state of the reception UE or the predetermined reference. Here, the information indicating one or more regions associated with the object may be included in the parameter for point cloud transmission and reception.

FIG. 20A illustrates an example in which a point cloud is illustrated in a 3D space. That is, FIG. 20A illustrates the point cloud of human shown in FIG. 9 in different directions.

Referring to FIG. 20A, the original of the point cloud shown in FIG. 20A consists of 775.745 points. However, the point cloud in the left picture (a) of FIG. 20A consists of 155,149 points that are about ⅕ of the original, and the point cloud in the right picture (b) of FIG. 20A consists of 77,575 points that are about ¹⁄₁₀ of the original. Unlike a 2D still image or a moving picture, a point cloud may allow an object or human to be seen in every direction. As shown in FIG. 15, as the number of points is decreased, an image quality may be degraded. That is, an image quality of the right picture (b) consisting of smaller points than the left picture (a) may be further degraded.

Figure 20B:
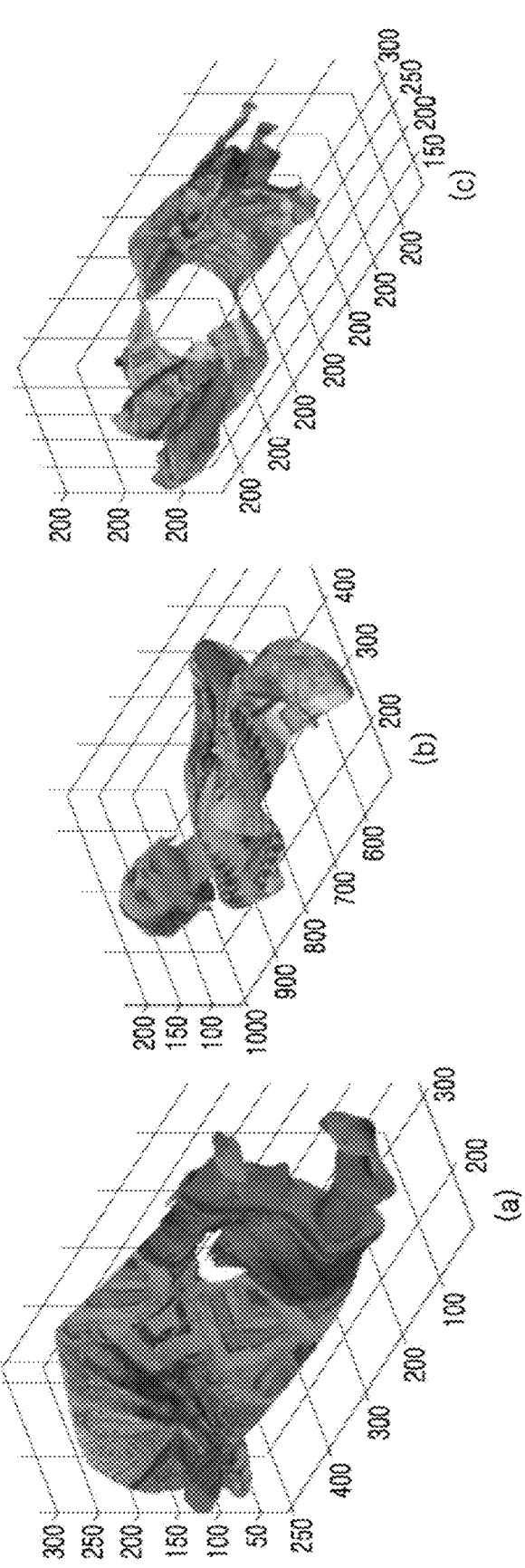
FIG. 20B illustrates an example in which a part of a point cloud is transmitted.
Figure 20C:
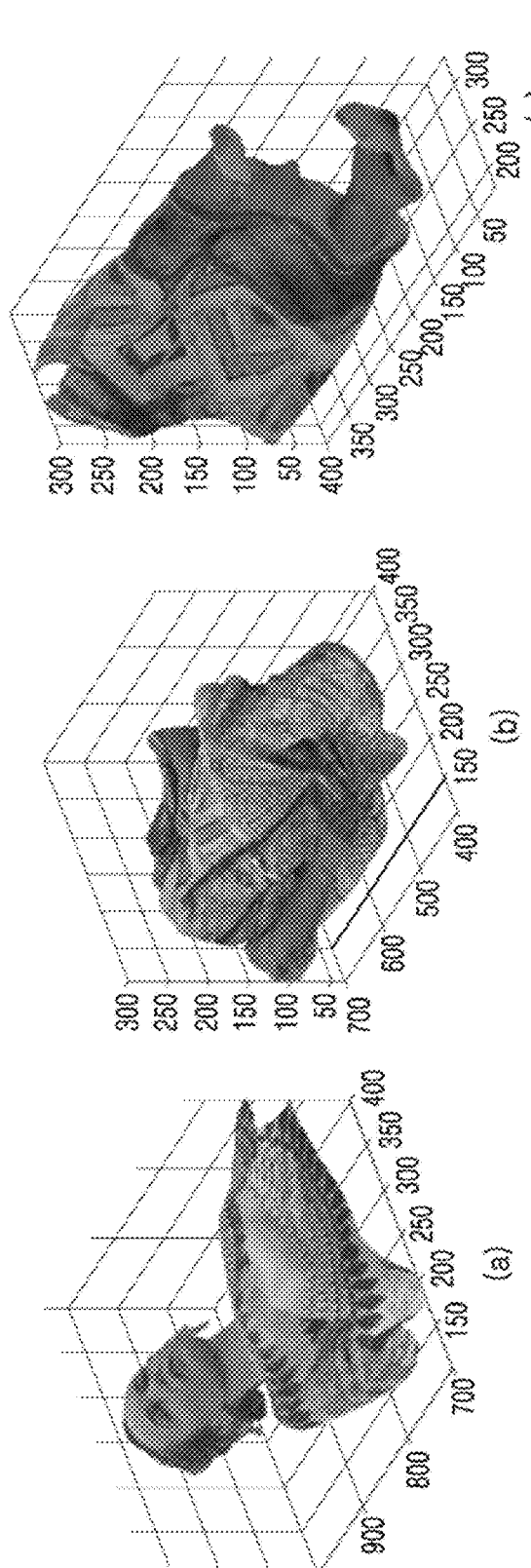
FIG. 20C illustrates an example in which a part of a point cloud is transmitted according to an embodiment of the present disclosure.

FIG. 20B illustrates an example in which a part of a point cloud is transmitted. FIG. 20C illustrates an example in which a part of a point cloud is transmitted according to an embodiment of the present disclosure.

Referring to FIGS. 20B and 20C, a reason why it is requested to specify 3D spaces for partial transmissions of a 3D image by a point cloud pre-processor is shown. As shown in FIG. 20B, when a point cloud is transmitted by being segmented by ⅓ without understanding of an arrangement of content on a space, there may occur a problem in which a part of an object is not appropriately segmented.

However, as shown in FIG. 20C, when a reception UE specifies and requests a desired 3D space from a transmission UE, the transmission UE may segment the object into spaces such as an upper body, a torso, a lower body, or the like having contexts. Then, the transmission UE may transmit, to the reception UE, point clouds of the segmented spaces. As described above, in order for the reception UE to request the desired 3D space from the transmission UE, it may be preferable for the transmission UE to provide information about spaces being selectable by the reception UE.

In an embodiment, spaces into which an object can be segmented may overlap with each other, and may be provided independently from other space, according to locations of parts of the object and usage purpose of the reception UE. The reception UE may select one or more desired spaces, based on the information about spaces received from the transmission UE. Then, the reception UE may transmit information about selected spaces to the transmission UE, thereby receiving a 3D image formed of selected spaces.

FIG. 21 illustrates an example of a transmission message of a transmission UE which is generated based on a space parameter according to an embodiment of the present disclosure.

In more detail, FIG. 21 illustrates space information and an annotation provided by the transmission UE. A reception UE may instruct space information of a 3D image which is requested for the transmission UE to transmit when a network situation is not available, according to a reference including the annotation, a relation to a direction in which a user of the reception UE has a view within a space, a default behavior of a video call application running in the reception UE, or a preference predetermined by the user.

According to an embodiment, the transmission UE supporting provision and selection of a space may include an indicator such as soi_enabled in a SDP offer message. When the transmission UE provides an annotation about a space, the transmission UE may include, in the SDP offer message, annotation=yes and annotation-schema. Then, the transmission UE may repeat, by the number of spaces, one or more annotation numbers [x1,y1,z1,x2,y2,z2: annotation_id1, annotation_id2, . . . ] associated with two vertexes [x1,y1, z1,x2,y2,z2] to indicate a space, and may include such generated numbers in the SDP offer message.

The reception UE according to an embodiment of the present disclosure may include an application to provide a video call function based on a 3D image transmitted by the transmission UE. In re-negotiation between the transmission UE and the reception UE due to a network situation, the reception UE may receive the SDP offer message provided by the transmission UE. When the SDP offer message includes soi_enabled, the reception UE may identify that the entirety or only a part of a space associated with an object is to be received from the transmission UE.

In an embodiment, when the reception UE identifies one or more spaces with respect to the object, not an entire part of the object, the reception UE may give a priority order to spaces, according to various evaluation references, and thus, may determine spaces to be requested to the transmission UE. For example, the evaluation references may include a first reference by which a space including an upper body or a body part of the upper body (e.g.: both shoulders of a torso, a neck and a head of the torso, or the like) for determination of a facial expression, a face, a gesture, or the like of a speaker, according to a characteristic of a 3D video call service, has a priority. Also, the evaluation references may include a second reference by which a variance according to accumulated movement of the speaker in a space has a priority. The evaluation references may include a third reference by which a preference pre-selected by a user of the reception UE is followed, a fourth reference by which statistics of a change history of different selections is followed, or a fifth reference by which a heuristic algorithm such as artificial intelligence (AI) is followed.

In an embodiment of the present disclosure, a video call may be considered as a reference of selecting a space. When a space is selected according to a network situation in a usage example where the transmission UE and the reception UE perform transmission of a 3D image, embodiments of the present disclosure may be applied to any case where an operation of the reception UE is determined based on a reference of a service feature and statistics on designation or usage by the user of the reception UE.

According to an embodiment, the reception UE may select, by complexly using the references, a space to be received with a priority according to a network situation. Then, the reception UE may transmit the selection of the space to the transmission UE via a message as in FIG. 33B. The transmission UE may transmit, to the reception UE, a 3D image corresponding to only the space selected by the reception UE.

FIGS. 22 to 24 to be described below illustrate an example of a session description protocol (SDP) for negotiating a point cloud transmission and reception scheme between a transmission UE and a reception UE. FIGS. 27, 28, and 29 illustrate a format of an instruction for dynamically changing the point cloud transmission and reception scheme between UEs according to a change in a network load or channel state, the point cloud transmission and reception scheme being determined by using procedures of FIGS. 22 to 24.

FIG. 22 illustrates an example of a transmission message of a transmission UE according to an embodiment of the present disclosure.

FIG. 22 illustrates a SDP offer message a UE capable of transmitting or receiving a point cloud transmits to the other UE via an IMS. That is, FIG. 22 illustrates a SDP offer message that is transmittable from a transmission UE to a reception UE. The SDP offer message may be included in a session initiation protocol (SIP) and may be transmitted to the other UE via multiple nodes of the IMS. The UE may propose, via the SDP offer message of FIG. 22, the other UE to bidirectionally (a=sendrecv) transmit and receive a frame by compressing the frame with the H.265 video codec, the frame including multiple patches shown in FIG. 11. Hereinafter, with reference to FIG. 22, the UE may refer to a transmission UE and the other UE may refer to a reception UE.

In the SDP offer message of FIG. 22, a=imageattr: 99 send [x=1920,y=1080] [x=1280,y=720] recv [x=1920,y=1080] [x=1280,y=720] type [one] [gao] [gao2] may propose that, when the patches of FIG. 11 are collected on a plane and are compressed as a video image, the other UE is to select 1920×1080 or 1280×720 as a maximum resolution of an image buffer, i.e., a plane to be bidirectionally used by a video codec. Here, the image buffer may indicate a 2D image generated from the point cloud pre-processor 1506 of FIG. 15. Here, the generated 2D image may be three types of a location (i.e., geometry) on a space, color of point cloud (i.e., attribute), or information indicating whether it is information for each pixel in the 2D image (e.g., occupancy map), according to information included in the 2D image among a plurality of pieces of information of a 3D image. After a resolution of the image buffer is designated, a type of the image buffer may be displayed via "type". That is, when "type" is [one], it may mean that all types of 2D images are stored in one image buffer.

If 2D images are storage in separate image buffers according to types of the 2D images, g (Geometry), a (Attribute), o (Occupancy), and the number of layers for each type may be sequentially displayed for each image buffer type. For example, gg may indicate that a geometry image buffer has two layers. Also, when one or more image buffer types have different resolutions, a number such as 2 may be added to the end (e.g.: o2). Here, a resolution of an image buffer of a corresponding type may indicate a value obtained by dividing a width and height of a resolution defined in imageattr by a number (e.g.: when a resolution of imageattr is x=1920, y=1080, and type is o2, a resolution of an occupancy map is 960×540). That is, a number (e.g.: 2 of o2) that is addible to the end of the letter indicating a type of an image buffer may indicate a value used to divide a width and a height of a resolution of the image buffer.

According to an embodiment, in the SDP offer message of FIG. 22, a=pointcloud: 99 ply; vpcc; ply xyz: 10 rgb1:8 rgb2:8; profile-id=Basic; rec-level: 0; level-id=1; max_vertex 100000; max_vertex_per_second 10000000; max_patch_length_x=500; max_patch_length_y=500 may propose that maximum 100000 points of a point cloud with PLY format are to be transmitted by using a bitrate equal to or less than 10 Mbps (b=AS: 10000). In the SDP offer message of FIG. 22, profile-id and rec-level and level-id may respectively indicate a type (e.g.: basic or extended) of a profile used in point cloud compression, a level (e.g.: 0, 1 or 2) for 3D image reconstruction, and a parameter for representing a quality (e.g.: 1: about 1 million per frame, 2: about 2 millions) of the compressed point cloud.

According to an embodiment, in the SDP offer message of FIG. 22, max_vertex may indicate a maximum number of points per frame of a point cloud media. max_vertex_per_second may indicate a total sum of points included in frames being transmitted per second. For max_vertex or max_vertex_per_second described above, an appropriate value may be designated according to processing capability of a generating entity of the transmission UE or a rendering entity of the reception UE.

According to an embodiment, in the SDP offer message of FIG. 22, 99 may indicate a payload type number allocated to this session including the point cloud media. Then, ply xyz: 10 rgb1:8 rgb2:8 may indicate that a data array with PLY format is X, Y, Z coordinates represented with 10 bits and two R, G, B color components each represented with 8 bits. That is, when one or more color components are applicable to one XYZ location, existence of n rgb attributes may be represented in a manner of ply xyz: 10 rgb1:8 rgb2:8 . . . rgbn:8. max_patch_length_x=500 and max_patch_length_y=500 may indicate maximum horizontal and vertical lengths of each patch and may indicate that the maximum horizontal and vertical lengths of each patch is 500 points.

According to an embodiment, if only one of two different conditions included in a SDP offer message is satisfied, e.g., if a transfer bitrate with respect to a point cloud is not greater than 10 Mbps but 120000 points are used, or on the contrary, if 100000 points are used but a transfer bitrate with respect to a point cloud is greater than 15 Mbps, it may be configured such that all the conditions described above are not to be exceeded. That is, it may be configured such that a transfer bitrate with respect to a point cloud is not to be greater than 10 Mbps and points not greater than 100000 are to be used.

However, when the transmission UE or the reception UE attempts to transmit or receive a point cloud media consisting of 100000 points or more while maximally using a given bandwidth, e.g., a bandwidth of 10 Mbps, one prioritized condition that ignores other conditions may be designated. An example of the prioritized condition is provided with reference to FIG. 23.

FIG. 23 illustrates an example of a transmission message of a transmission UE according to an embodiment of the present disclosure.

FIG. 23 proposes a method by which a prioritized parameter such as prioritized AS vertex patch is selectively specified and transferred via a SDP offer message. A plurality of different prioritized parameters may be designated in ascending priority order. For example, the example of FIG. 23 illustrates that the number of vertexes (i.e., the number of point clouds) may be ignored when a bitrate meets a condition, or a limit in a patch size may be ignored when a bitrate and the number of vertexes meet a condition. However, in an embodiment, all conditions that are not specified as prioritized parameters may not be changed or exceeded. That is, with respect to a condition such as codec or profile which is not specified as a prioritized parameter, the transmission UE may operate according to a SDP protocol. That is, a point cloud to be transmitted or received may be determined based on parameters provided via a SDP offer message.

Referring to FIGS. 27, 28, 29, 30a, 30b, 31, 32a, 32b, 33a, 33b, and 34, one message or a plurality of messages may be transmitted to a transmission UE or a reception UE, and accordingly, a point cloud of an object may be generated as in FIG. 15 so as to meet one or more conditions.

According to an embodiment, doi_enabled specified in a SDP Offer message may indicate a flag by which the transmission UE indicates a support of a point cloud processing/encoding function using DOI information of the reception UE. According to an embodiment, that the flag is not included in the SDP offer message may mean that the transmission UE and a session between the transmission UE and the reception UE do not support the point cloud processing/encoding function using the DOI information of the reception UE.

According to an embodiment, the transmission UE may provide a separate labeling function with respect to a part of a 3D image by using additional processing such as AI. For example, the transmission UE may provide the reception UE with an annotation that is combined with a DOI and is about a part of a 3D image which is indicated by the DOI, as shown in FIGS. 32A and 32B. For example, when a schema is indicated with reference to FIG. 22, the transmission UE may display an annotation according to the indication. Alternatively, when only existence or non-existence of an annotation is displayed without a schema, the transmission UE may describe a DOI in the form of descriptive text.

FIG. 24 illustrates an example of a response message to a transmission message of a transmission UE according to an embodiment of the present disclosure.

According to an embodiment, a reception UE receives the SDP offer message of FIG. 22 or FIG. 23, and FIG. 24 illustrates a SDP Answer message in which a quality of service (QoS) parameter is modified to be applicable to a session and that is transmitted back. With the SDP answer message, the reception UE may specify that the reception UE receives a point cloud compressed with H.265 codec but does not transmit it to the other UE (a=recvonly). The reception UE may include, in the SDP answer message, information indicating that the reception UE uses a resolution of 1280×720 as an image buffer resolution and uses a bitrate equal to or less than 6 Mbps. For example, all patches of each frame with a maximum size of 500×500 may be included within a maximum resolution of 1280×720 agreed between the transmission UE and the reception UE. In an embodiment, when doi_enabled flag is included in the SDP Answer message, it may mean that the reception UE requests the transmission UE for Direction of Interest based delivery session. Here, direction of interest metadata RTCP channel as in FIG. 30A may be used for the request.

Figure 25:
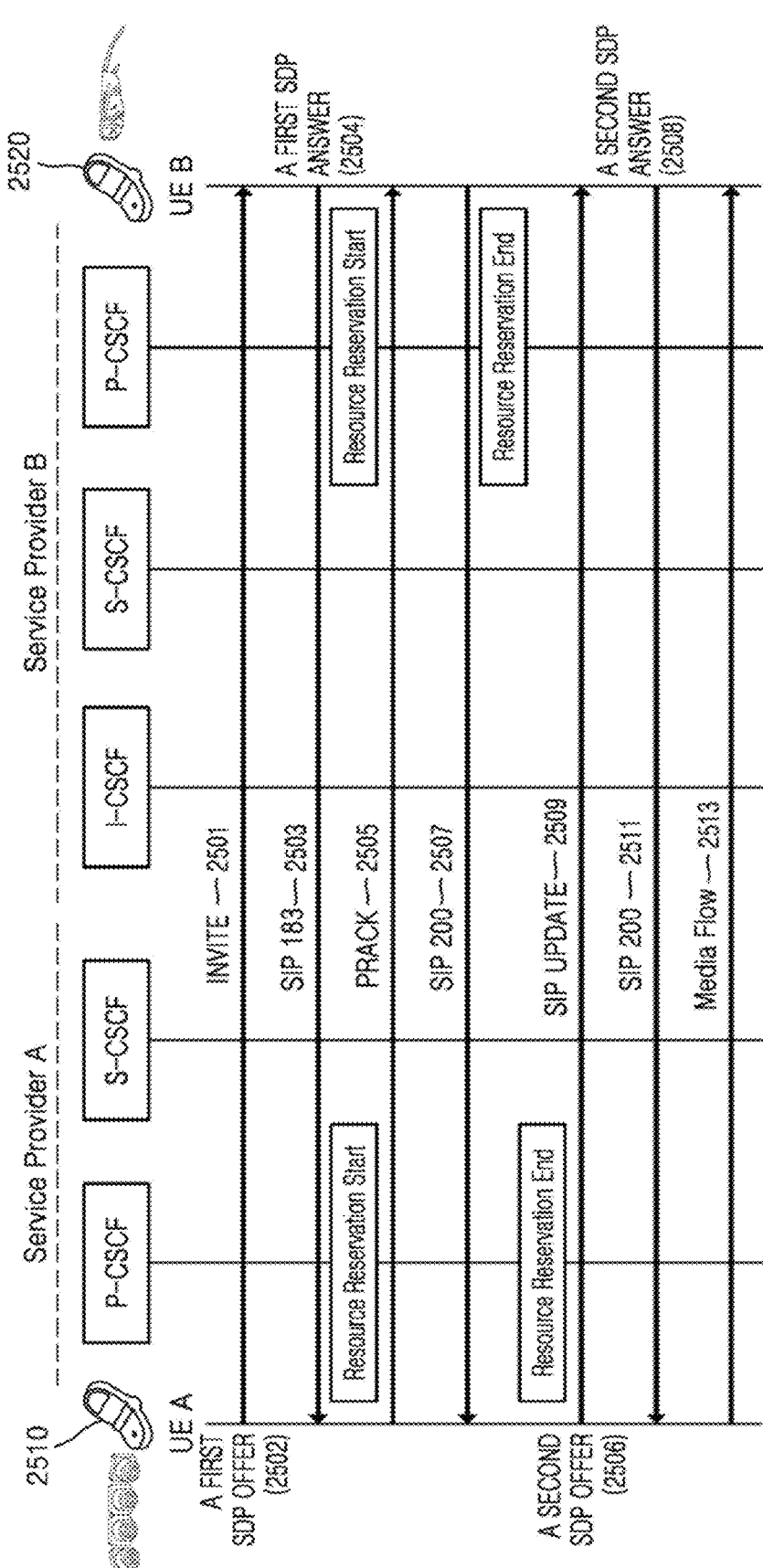
FIG. 25 illustrates a procedure of negotiation between a transmission UE and a reception UE for transmission of a point cloud according to an embodiment of the present disclosure.

FIG. 25 illustrates a procedure of negotiation between a transmission UE and a reception UE for transmission of a point cloud according to an embodiment of the present disclosure. For example, FIG. 25 illustrates a procedure in which a transmission UE (UE A) 2510 and a reception UE (UE B) 2520 negotiate a transmission scheme for a point cloud by using the IMS shown in FIG. 14, and ensure a QoS of a wired or wireless transmission path.

Referring to FIG. 25, in an embodiment, the transmission UE 2510 may include a first SDP offer message 2502 in an SIP INVITE message 2501 and may transmit the message the to a proxy call session control function (P-CSCF) that is an IMS node allocated to it. The message may be transferred via nodes such as a session call session control function (S-CSCF), an interrogating call session control function (I-CSCF), etc. to an IMS to which the other UE is connected and may be finally transferred to the reception UE 2520. In an embodiment, the first SDP offer message 2502 may include an SDP offer shown in FIGS. 21 to 23.

In an embodiment, the reception UE 2520 may select an available bitrate and transmission scheme among bitrates and point cloud transmission schemes proposed by the transmission UE 2510. Then, the reception UE 2520 may include a first SDP answer message 2504 including the selected information in an SIP 183 message 2503 and may transmit the message to the transmission UE 2510. In a procedure where the SIP 183 message 2503 including the first SDP answer message 2504 is transferred to the transmission UE, each of IMS nodes may start reserving transmission resources of wired/wireless network requested for the service. Then, all conditions of a session including point cloud transmission may be agreed between the transmission UE 2510 and the reception UE 2520 via exchange of additional messages including a PRACK message 2505, an SIP 200 message 2507, an SIP UPDATE message 2509 and an SIP 200 message 2511. For example, the transmission UE 2510 may generate and transmit a second SDP offer message 2506 in response to a state change from a state (e.g.: a network state) of the transmission UE 2510 at a transmission time of the first SDP offer message 2502, or as a default regardless of the state change. In response thereto, the reception UE 2520 may generate and transmit a second SDP answer message 2508.

Figure 26:
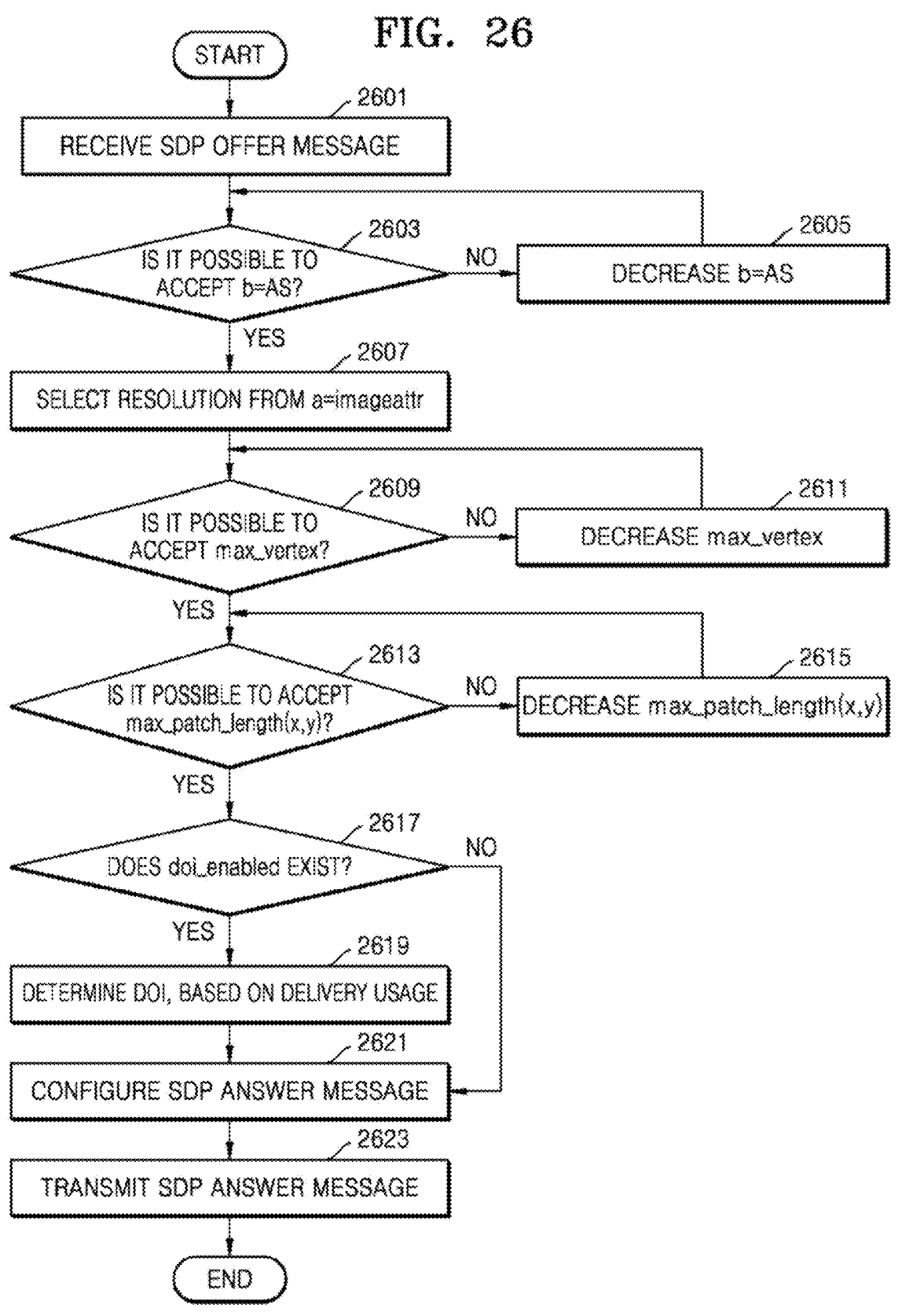
FIG. 26 is a flowchart of a response message generation procedure in the reception UE according to an embodiment of the present disclosure.

According to an embodiment, when the transmission UE identifies transmission resources of all transmission durations, the transmission UE may transmit a point cloud to the reception UE via a Media Flow message 2513. However, it is not always requested for the point cloud to be transmitted via the Media Flow message 2513, and the point cloud may be transmitted from the transmission UE to the reception UE, regardless of a message format. FIG. 26 to be described below illustrates a procedure in which the reception UE 2520 generates the SDP answer message based on the SDP offer message transmitted by the transmission UE 2510.

FIG. 26 is a flowchart of a response message generation procedure in the reception UE according to an embodiment of the present disclosure. In more detail, FIG. 26 illustrates a procedure in which the transmission UE analyzes the SDP offer message transmitted by the transmission UE and then generates and transmits the SDP answer message in FIG. 25.

Referring to FIG. 26, in operation 2601, the reception UE may receive an SDP offer message. That is, the reception UE may receive, from the transmission UE, a message including a parameter for point cloud transmission and reception.

In operation 2603, the reception UE may determine whether it is possible to accept b=AS. That is, the reception UE may compare b=AS value in the received SDP offer message with a maximum bitrate value available for the reception UE, thereby determining whether it is an acceptable value. For example, when it is not acceptable value, the reception UE may decrease b=AS value in operation 2605. That is, when a bitrate is not acceptable, the reception UE may decrease the bitrate to be equal to or less than the maximum bitrate value acceptable for the reception UE.

In operation 2607, the reception UE may select a resolution from a=imageattr. For example, after the reception UE determines whether the bitrate is within an acceptable range in operation 2603, the reception UE may determine a resolution appropriate for the reception UE.

In operation 2609, the reception UE may determine whether it is possible to accept max_vertex. For example, the reception UE may determine whether the number of points (max_vertex) in the SDP offer message is appropriate for a bitrate and a resolution which are determined in previous operation (e.g.: operation 2603 to operation 2607). When max_vertex included in the SDP offer message is not acceptable, the reception UE may decrease max_vertex in operation 2611. That is, the reception UE may decrease max_vertex included in the SDP offer message to be within a range for the reception UE can accept.

In operation 2613, the reception UE may determine whether it is possible to accept max_patch_length(x,y). That is, the reception UE may determine whether it is possible to accept a maximum patch length that is max_patch_length (x,y) value in the received SDP offer message. When it is not acceptable, the reception UE may decrease max_ patch_length(x,y) in operation 2615. That is, when the maximum patch length is not acceptable, the reception UE may decrease the maximum patch length to be within a range for the reception UE can accept.

In operation 2617, the reception UE may check whether doi_enabled exists. For example, the reception UE may identify that doi_enabled that is an indicator indicating whether DOI information of the reception UE is usable is included in the SDP offer message received from the transmission UE. In an embodiment, when doi_enabled is not included in the SDP offer message, the reception UE may generate an SDP answer message in operation 2621, based on the bitrate, the resolution, the number of points of a point cloud, a maximum number of patches, etc. which are described in operations 2603 to 2613.

In operation 2619, the reception UE may determine DOI, based on a delivery usage. That is, after the reception UE identifies that the indicator of doi_enabled is included in the SDP offer message, the reception UE may determine the DOI, based on the delivery usage indicating a usage example such as a video call.

In operation 2621, the reception UE may generate the SDP answer message, based on the bitrate, the resolution, the number of points of a point cloud, the maximum number of patches, the DOI, etc. which are described in operations 2603 to 2619.

In operation 2623, the reception UE may transmit the SDP answer message. That is, the reception UE may transmit, to the transmission UE, the SDP answer message generated in operation 2621. In an embodiment, the reception UE may include the SDP answer message in the SIP 183 message and may transmit the message to the transmission UE.

According to an embodiment, after a session condition is determined based on the procedure of FIG. 26, the transmission UE may transmit, to the reception UE, a point cloud compressed based on the session condition. However, at this time, a situation where a scheduled bitrate cannot be maintained due to deterioration in a channel state may occur. In this case, the transmission UE may transmit, to the transmission UE, a TMMBR message as shown in FIG. 6, thereby requesting to temporarily decrease the bitrate. In an embodiment, when the reception UE transmits the TMMBR message, the reception UE transmits the TMMBR message together with a message shown in FIG. 27, thereby requesting to decrease a maximum number of point clouds per frame.

FIG. 27 illustrates an example of metadata transmitted from the reception UE to the transmission UE according to an embodiment of the present disclosure. A field of Number of Points in the message shown in FIG. 27 may indicate a parameter of max_vertex of an SDP message. The field of Number of Points may indicate the number of points between 0 and 23-1. That is, Maximum Number of Points of FIG. 27 may indicate a maximum number of points which can constitute a point cloud.

According to an embodiment, a maximum or minimum proportion of a surface of human or object which can be represented as a point cloud may be adjusted with adjustment of a bitrate. For example, FIGS. 28 and 29 to be described below illustrate examples of a message transmitted for adjustment of a maximum or minimum proportion of a surface of an object which can be represented as a point cloud.

That is, FIG. 28 illustrates an example of metadata transmitted from the reception UE to the transmission UE according to an embodiment of the present disclosure. FIG. 29 illustrates an example of metadata transmitted from the reception UE to the transmission UE according to an embodiment of the present disclosure.

A field of Maximum Proportion of Represented Surface in the message shown in FIG. 28 and a field of Minimum Proportion of Represented Surface in the message shown in FIG. 29 may be represented with a value indicating a proportion of 0 to 100% in a unit of 1%. For example, when it is not possible to transmit 100% of a surface, the transmission UE may select a point cloud of a region which is determined, by the transmission UE, to be important for the reception UE and may transmit the point cloud. When the channel state is improved thereafter, the reception UE may transmit the TMMBR message and the messages of FIGS. 27 and 28 to the transmission UE, and thus, may gradually a bitrate and the number of points, a proportion of the surface, and the like, thereby allowing the bitrate, the number of points, the proportion of the surface, and the like to have their negotiated original values before a service starts.

According to an embodiment, even when a bitrate and the number of points which are currently used are appropriate, it may be necessary for the reception UE to request the transmission UE to process and transmit points in an important direction with priority. For example, as a necessity of points displaying the back of a person who is addressing or talking may be low, the reception UE may transmit a DOI information message as shown in FIG. 30A so as to notify the transmission UE of an important direction.

FIG. 30A illustrates an example of metadata transmitted from the reception UE to the transmission UE according to an embodiment of the present disclosure.

Via a message shown in FIG. 30A, a random DOI of the reception UE which is in a 3D space as shown in FIG. 20A may be indicated. For example, in FIG. 30A, fields of X, Y, Z may indicate a start point of a vector indicating a DOI and fields of TX, TY, TZ may indicate an end point of the vector indicating the DOI. According to an embodiment, the fields of X, Y, Z, TX, TY, TZ may be indicated with real numbers each having a range between 0 and 1. Then, the reception UE may synchronize an original point of the object represented as the point cloud with an original point of the vector of the DOI, may synchronize X, Y, and Z axes, and then may convert coordinates to be synchronized with coordinates of the vector of the DOI, wherein the coordinates are obtained by normalizing, as 0 to 1, coordinates of the object represented as the point cloud. For example, when it is assumed that a start point of a vector of a DOI with respect to a point cloud object with a size of X axis of 0 to 500, Y axis of 0 to 1000, and Z axis of 0 to 3000 is (1, 0.5, 0.5) and an end point thereof is (0, 0.5, 0.5), the start point and the end point of the vector of the DOI with respect to the point cloud object may correspond to (500, 500, 1500) and (0,500, 1500). This may indicate that the DOI is set facing forward in the X-axis direction at the center of YZ plane.

According to an embodiment, in FIG. 30B, the same message format as FIG. 30A is used but a different subtype is indicated, such that a region of SOI in the 3D space as shown in FIG. 30A may be indicated. That is, the fields of X, Y, Z in FIG. 30B may indicate a start point of a hexahedron representing the region of SOI, and the fields of TX, TY, TZ may indicate an end point of the hexahedron representing the region of SOI, such that a size and a location of the hexahedron may be indicated. Here, in order to represent a rotation of the SOI, W parameter may be used. That is, the reception UE may rotate the vector connecting the start point (XYZ) to the end point (TXTYTZ) in a clockwise direction by a value of W angle by using the W parameter, and may display a result thereof as the region of SOI. The reception UE may transmit, to the transmission UE, the region of SOI determined as described above. Then, the transmission UE may transmit a point cloud corresponding to only the indicated region of SOI as in FIG. 20C.

A scheme of displaying a region of interest (ROI) described with reference to FIGS. 30A and 30B is similar to a viewport of VR in that it is an ROI a view has interest, however, the VR indicates, to a viewport, a direction in which the viewer watches with equipment such as HMD whereas, in the present disclosure, a direction in which the viewer watches may be different from a DOI. That is, in a scenario such as an AR video call, when a 3D image of the other person is displayed on the front side of the viewer, although a viewport with respect to the 3D image of the other person faces forward, the profile or the back of the other person may be indicated as a DOI via a separate user interface (UX), and a UE of the other person (i.e., a transmission UE) may transmit only the indicated part. Alternatively, when multiple virtual participants are seated as in a virtual meeting, the profiles of the participants are seen (viewports are the profiles) at a location of the viewer, but the viewer indicates only the front sides of the participants as a DOI so as to allow parts corresponding to only the front sides to be transmitted.

Figure 31:
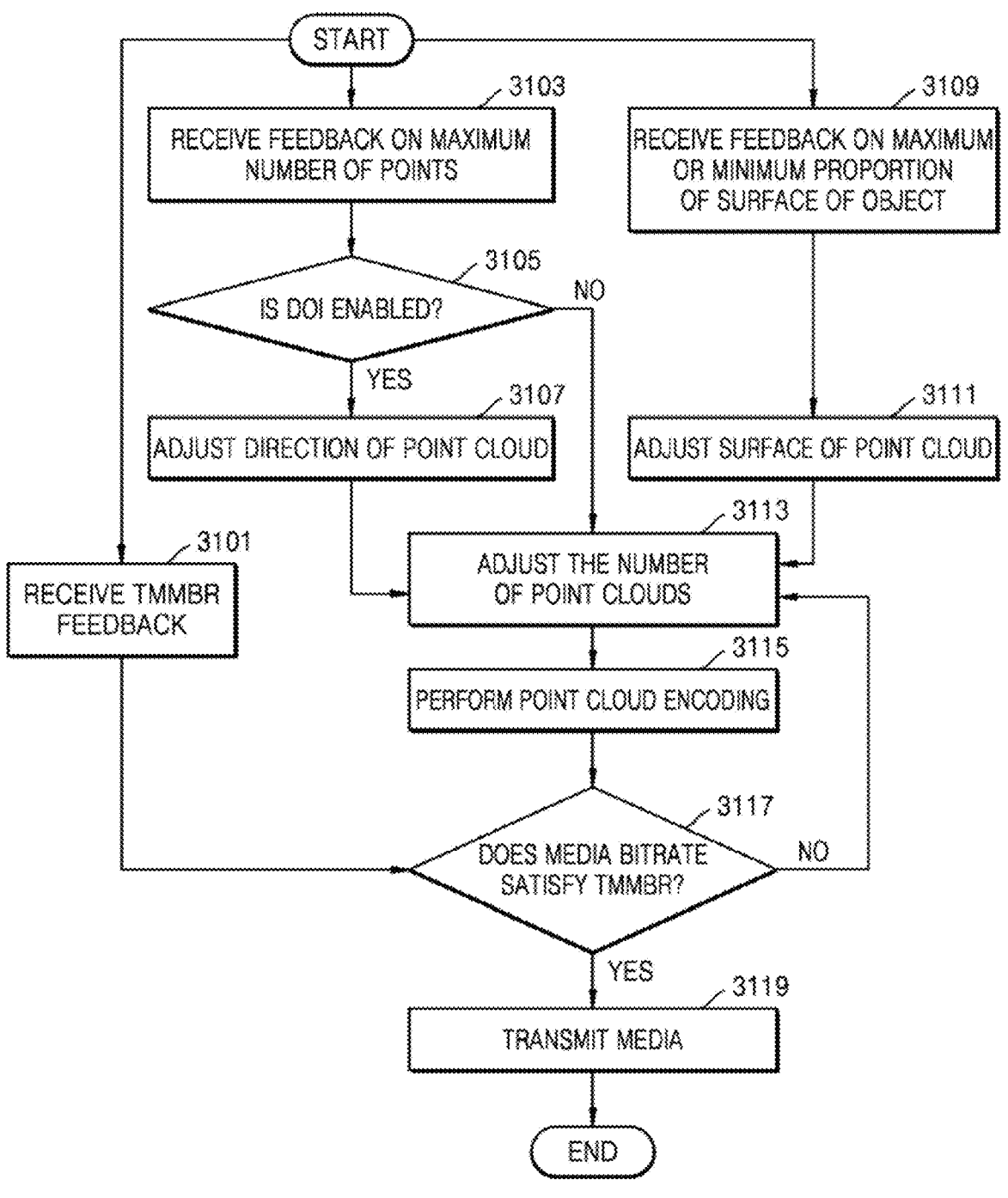
FIG. 31 illustrates a flowchart of a procedure in which a transmission UE transmits point cloud media, based on a message received from a reception UE, according to an embodiment of the present disclosure.

FIG. 31 illustrates a flowchart of a procedure in which the transmission UE transmits point cloud media, based on a message received from the reception UE, according to an embodiment of the present disclosure. That is, FIG. 31 illustrates an embodiment that is occurrable when the transmission UE receives multiple messages about point cloud media from the reception UE via RTCP APP packets as a situation of a communication network changes after a session is set up between the transmission UE and the reception UE.

Referring to FIG. 31, in operation 3101, the transmission UE may receive TMMBR feedback from the reception UE. Then, the transmission UE may receive, via the TMMBR feedback, a bitrate requested by the reception UE.

In operation 3103, the transmission UE may receive feedback on a maximum number of points. In operation 3105, the transmission UE may check whether DOI is enabled. If the DOI is not enabled, the transmission UE may adjust the number of point clouds in operation 3113. That is, the transmission UE may adjust the number of points included in a point cloud. When the DOI is enabled, in operation 3107, the transmission UE may adjust a direction of the point cloud. That is, when the DOI is enabled, the transmission UE may adjust the direction of the point cloud, based on DOI information received from the reception UE.

In operation 3109, the transmission UE may receive feedback on a maximum or minimum proportion of a surface of an object. That is, the transmission UE may receive, from the reception UE, information about a maximum proportion or a minimum proportion as shown in FIGS. 28 and 29. In operation 3111, the transmission UE may adjust a surface of a point cloud. For example, the transmission UE may adjust a surface proportion of the point cloud, based on the received maximum or minimum proportion of the surface of the object.

In operation 3113, the transmission UE may adjust the number of point clouds. That is, the transmission UE may adjust the number of points included in a point cloud. In operation 3115, the transmission UE may perform point cloud encoding. In operation 3117, the transmission UE may determine whether a media bitrate satisfies TMMBR. That is, the transmission UE may determine whether the media bitrate satisfies the bitrate received via the TMMBR message. If not satisfied, the transmission UE may perform again operation 3113. For example, the transmission UE may set the bitrate received in operation 3101 as a target amount of transmission, may perform an adjustment process to correspond to the set target amount of transmission, and thus, may adjust the number of points to be included in the point cloud. In operation 3119, the transmission UE may transmit media. That is, the transmission UE may transmit, to the reception UE, the point cloud processed via operations 3101 to 3117 described above.

According to an embodiment, the reception UE may select and indicate, among parameters included in an SDP offer message, characteristics for particularly defining a transmission quality. Metadata to request the characteristics may be represented as shown in FIGS. 27 to 30B.

FIG. 32A illustrates an example in which the transmission UE provides an annotation to the reception UE according to an embodiment of the present disclosure.

For example, FIG. 32A illustrates a method by which the transmission UE provides the reception UE with the annotation about a region indicated by DOI when annotation provision is indicated. According to an embodiment, with respect to a designated direction, an annotation may be provided as a length of descriptive text (e.g.: descriptive text) or actual text (e.g.: Annotation value).

FIG. 32B illustrates an example in which the transmission UE provides an annotation to the reception UE according to an embodiment of the present disclosure.

For example, FIG. 32 illustrates a case in which an annotation is provided with annotation schema. For example, when an upper body of an object is indicated, 0, 1, 2, 3, 4, 5, 6, 7, 14 may be indicated in annotation_value. Alternatively, when only a face (head) is indicated as DOI, 0 may be indicated in annotation_value.

FIG. 33A illustrates an example in which the reception UE provides the transmission UE with a response corresponding to an annotation according to an embodiment of the present disclosure.

For example, FIG. 33A illustrates a method by which the reception UE requests the transmission UE for only a part of a 3D image which corresponds to a particular annotation.

FIG. 33B illustrates an example in which the reception UE provides the transmission UE with a response corresponding to an annotation according to an embodiment of the present disclosure. FIG. 33B illustrates a method by which the reception UE requests the transmission UE for only a part of a 3D image which corresponds to a particular annotation. However, unlike FIG. 33B, FIG. 33A illustrates an embodiment in which the reception UE indicates only an annotation without indication of an interest type. Unlike FIG. 33A, in FIG. 33B, the reception UE may notify the transmission UE of an interest type along with an annotation value. In FIG. 33B, Interest_type may be used as 0: none, 1: direction, 2: space, 3: reserved, and Annotation values may be used to indicate a plurality of regions or directions of interest, as 0,1,2.

FIG. 34 illustrates an example of a method of indicating, via an annotation, a body part of human in a 3D image according to an embodiment of the present disclosure.

Referring to FIG. 34, an example of schema of indicating body parts of human in the 3D image is illustrated. For example, representative parts may be segmented with respects to joints of a human body and thus may be identified, and it is possible for the transmission UE and the reception UE to indicate a DOI or an SOI by designating a human text and a value.

FIG. 35 illustrates an example of a PLY format of a point cloud according to an embodiment of the present disclosure.

For example, FIG. 35 illustrates a part of a PLY format of a point cloud as illustrated in FIG. 20A. In FIG. 35, various types of additional information may be described, starting from ply that is the format up to end_header. Numbers thereafter may indicate RGB values and XYZ coordinates of each point. The coordinates may be the same as coordinates used with reference to FIG. 20A, and each coordinate may be equal to 0 or greater than 0. X, Y, Z, TX, TY, TZ of the message of FIG. 328 may correspond to the coordinates. However, when a bit of a field of +/− is set to 0, it may indicate an opposite direction.

According to the aforementioned embodiment of the present disclosure, according to a scheme of dynamically adjusting representations of a point cloud session between the transmission UE and the reception UE and a service condition negotiation procedure using an IMS, the number of points during the session, a surface proportion of an object or human represented as a point cloud, and a DOI, a method of compressing and transmitting a point cloud may be efficiently adjusted according to a change in a channel state with respect to the transmission UE or the reception UE. Via the efficient adjustment, a network capacity and media quality may be maximized.

Figure 36:
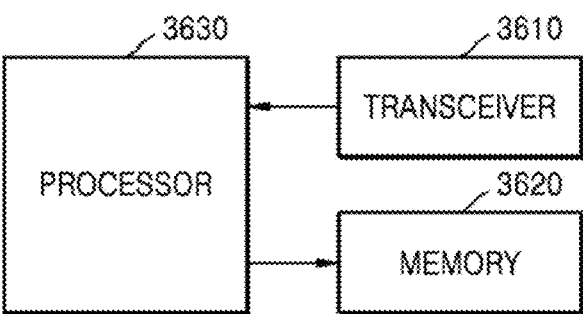
FIG. 36 illustrates a block diagram of a configuration of a transmission UE or a reception UE according to an embodiment of the present disclosure.

FIG. 36 illustrates a block diagram of a configuration of a transmission UE or a reception UE according to an embodiment of the present disclosure. Hereinafter, in FIG. 36, a UE may indicate the transmission UE or the reception UE.

As illustrated in FIG. 36, the UE of the present disclosure may include a processor 3630, a transceiver 3610, a memory 3620, and a camera 3640. However, elements of the UE are not limited to the example above. For example, the UE may include more elements than the elements described above or may include fewer elements than the elements described above.

For example, the transmission UE may further include a camera for obtaining a point cloud, and the reception UE may further include a display for displaying a received point cloud. Furthermore, the processor 3630, the transceiver 3610, and the memory 3620 may be implemented as one chip.

According to an embodiment, the processor 3630 may control a series of processes to allow the UE to operate according to the aforementioned embodiments of the present disclosure For example, the elements of the UE may be controlled to perform a method of controlling negotiation of parameters associated with a point cloud session between the transmission UE and the reception UE according to an embodiment of the present disclosure. The processor 3630 may be provided in a multiple number, and may perform, by executing a program stored in the memory 3620, the method of controlling negotiation of parameters associated with a point cloud session between the transmission UE and the reception UE of the present disclosure.

The transceiver 3610 may transmit or receive a signal to or from a BS. The signal being transmitted or received to or from the BS may include control information and data. The transceiver 3610 may include a RF transmitter for up-converting and amplifying a frequency of a signal to be transmitted, and an RF receiver for low-noise amplifying and down-converting a frequency of a received signal. However, this is merely an embodiment of the transceiver 3610, and elements of the transceiver 3610 are not limited to the RF transmitter and the RF receiver. Also, the transceiver 3610 may receive signals through wireless channels and output the signals to the processor 3630, and may transmit signals output from the processor 3630, through wireless channels. Also, the transceiver 3610 may transmit or receive a signal to or from the other UE. For example, when the transceiver 3610 is included in the transmission UE, the transceiver 3610 may transmit or receive a signal to or from the reception UE. Also, when the transceiver 3610 is included in the reception UE, the transceiver 3610 may transmit or receive a signal to or from the transmission UE.

According to an embodiment, the memory 3620 may store a program and data for operations of the UE. Also, the memory 3620 may store control information or data included in a signal transmitted or received by the UE. The memory 3620 may be implemented as a storage medium including a read only memory (ROM), a random access memory (RAM), a hard disk, a compact disc (CD)-ROM, a digital versatile disc (DVD), or the like, or any combination thereof. Also, the memory 3620 may be provided in a multiple number. According to an embodiment, the memory 3620 may store a program for performing a control operation for negotiation of parameters associated with a point cloud session between the transmission UE and the reception UE according to the embodiments of the present disclosure.

Figure 37:
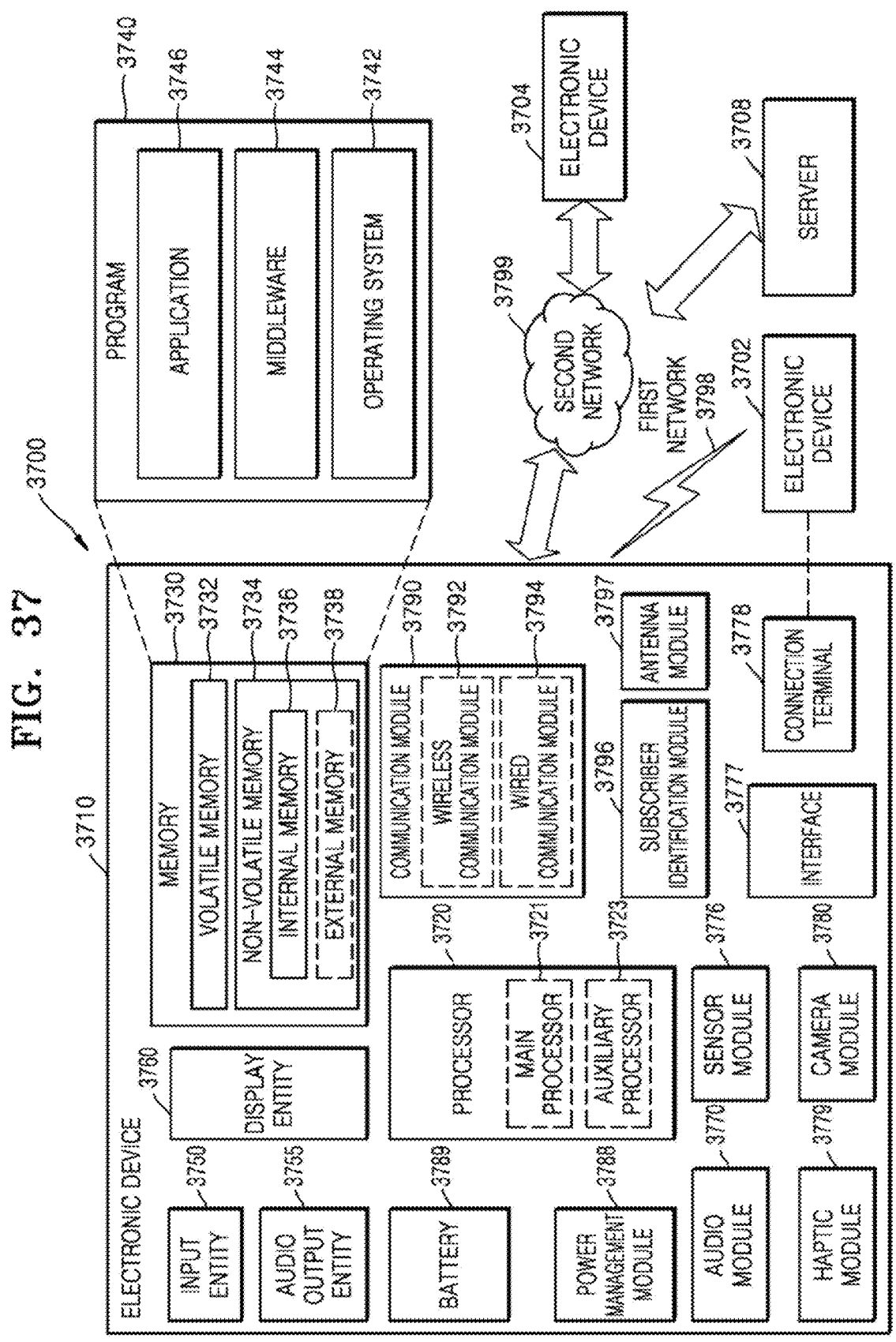
FIG. 37 illustrates a block diagram of a detailed configuration of a transmission UE or a reception UE according to an embodiment of the present disclosure.

FIG. 37 illustrates a block diagram of a detailed configuration of a transmission UE or a reception UE according to an embodiment of the present disclosure. Hereinafter, in FIG. 37, an electronic device 3710 may indicate the transmission UE or the reception UE according to the present disclosure. However, a configuration of the transmission UE or the reception UE is not limited to the configuration shown in FIG. 37. That is, the transmission UE or the reception UE according to the present disclosure may include some of the configuration shown in FIG. 37 or may include the entire configuration or may further include other configuration.

Referring to FIG. 37, the electronic device 3710 in a network environment 3700 may communicate with an electronic device 3702 via a first network 3798 (e.g.: a short-range wireless communication network) or may communicate with an electronic device 3704 or a server 3708 via a second network 3799 (e.g., a long-range wireless communication network). According to an embodiment, the electronic device 3710 may communicate with the electronic device 3704 via the server 3708. According to an embodiment, the electronic device 3710 may include a processor 3720, a memory 3730, an input entity 3750, an audio output entity 3755, a display entity 3760, an audio module 3770, a sensor module 3776, an interface 3777, a haptic module 3779, a camera module 3780, a power management module 3788, a battery 3789, a communication module 3790, a subscriber identification module 3796, or an antenna module 3797. In some embodiments, in the electronic device 3710, at least one element (e.g.: the display entity 3760 or the camera module 3780) among the elements may be skipped or at least one other element may be added. In some embodiments, some of the elements may be implemented as one integrated circuit. For example, the sensor module 3776 (e.g.: a fingerprint sensor, an iris sensor, or an illuminance sensor) may be implemented by being embedded to the display entity 3760 (e.g.: a display).

The processor 3720 may control at least one other element (e.g.: hardware or software element) of the electronic device 3710 connected to the processor 3720 and may perform various data processing or computations, by executing software (e.g.: a program 3740). According to an embodiment, as a part of the data processing or the computations, the processor 3720 may load, to a volatile memory 3732, a command or data received from another element (e.g.: the sensor module 3776 or the communication module 3790), may process the command or the data stored in the volatile memory 3732, and may store resultant data in a non-volatile memory 3734.

According to an embodiment, the processor 3720 may perform a control operation for negotiation of parameters associated with a point cloud session between the transmission UE and the reception UE.

For example, when the processor 3720 is included in the transmission UE according to the present disclosure, the processor 3720 may control elements of the transmission UE to obtain a point cloud by photographing an object, transmit, to the reception UE, a message including a parameter for point cloud transmission and reception, receive, from the reception UE, a response message including an application parameter of the reception UE, compress the point cloud, based on the application parameter of the reception UE, and transmit the compressed point cloud to the reception UE.

Alternatively, when the processor 3720 is included in the reception UE according to the present disclosure, the processor 3720 may control elements of the reception UE to receive, from the transmission UE, a message including a parameter for point cloud transmission and reception, determine an application parameter of the reception UE, based on a channel state of the reception UE and the parameter for point cloud transmission and reception, transmit, to the transmission UE, a response message including the determined application parameter of the reception UE, receive a point cloud from the transmission UE, and display an image associated with an object, based on the compressed point cloud.

According to an embodiment, the processor 3720 may include a main processor 3721 (e.g., a central processing unit (CPU) or an application processor (AP)) or an auxiliary processor 3723 (e.g., a graphics processing unit (GPU), an image signal processor (ISP), a sensor hub processor, or a communication processor (CP)) that may be operated together with or independently of the main processor 3721. As an addition or alternative, the auxiliary processor 3723 may use less power than the main processor 3721 or may be set to be specialized for a designated function. The auxiliary processor 3723 may be implemented separately from or as a part of the main processor 3721.

For example, the auxiliary processor 3723 may control at least some of the states or the function related to at least one element (e.g., the display entity 3760, the sensor module 3776, or the communication module 3790) among the elements of the electronic device 3710 on behalf of the main processor 3721 while the main processor 3721 is in an inactive (e.g., sleep) state or together with the main processor 3721 while the main processor 3721 is in an active (e.g., application execution) state. According to an embodiment, the auxiliary processor 3723 (e.g., the ISP or the CP) may be implemented as a part of another element (e.g., the camera module 3780 or the communication module 3790) functionally related thereto.

The memory 3730 may store various data to be used by at least one element (e.g.: the processor 3720 or the sensor module 3776) of the electronic device 3710. The data may include, for example, software (e.g.: the program 3740) and input data or output data about commands related thereto. The memory 3730 may include the volatile memory 3732 or the non-volatile memory 3734.

The program 3740 may be stored as software in the memory 3730 and may include, for example, an operating system (OS) 3742, middleware 3744, or an application 3746.

The input entity 3750 may receive a command or data to be used by an element (e.g., the processor 3720) of the electronic device 3710, from the outside (e.g.: a user) of the electronic device 3710. The input entity 3750 may include, for example, a microphone, a mouse, a keyboard, or a digital pen (e.g., a stylus pen).

The audio output module 1655 may output an audio signal to the outside of the electronic apparatus 1601. The audio output entity 3755 may include, for example, a speaker or a receiver. The speaker may be used for general purposes such as reproduction of multimedia or reproduction of recording, and the receiver may be used to receive incoming calls. According to an embodiment, the receiver may be implemented separately from or as a part of the speaker.

The display entity 3760 may visually provide information to the outside (e.g., the user) of the electronic device 3710. The display entity 3760 may include, for example, a display, a hologram display device, or a projector, and a control circuit for controlling the corresponding device. According to an embodiment, the display entity 3760 may include a touch circuitry configured to detect a touch or a sensor circuitry (e.g.: a pressure sensor) configured to measure the strength of a force generated by the touch.

According to an embodiment, when the display entity 3760 is included in the reception UE, the display entity 3760 may include an AR display for displaying the point cloud received from the transmission UE. In this case, the reception UE may display an AR image of a part of an object such as human or thing.

The audio module 3770 may convert a sound into an electric signal or convert an electric signal into a sound. According to an embodiment, the audio module 3770 may obtain a sound via the input entity 3750 or may output a sound via the audio output entity 3755 or an external electronic device (e.g., the electronic device 3702) (e.g., a speaker or a headphone) directly or wirelessly connected to the electronic device 3710.

The sensor module 3776 may detect an operating state (e.g.: power or temperature) of the electronic device 3710 or an external environmental state (e.g., user state) and may generate an electrical signal or data value corresponding to the detected state. According to an embodiment, the sensor module 3776 may include, for example, a gesture sensor, a gyro sensor, a barometric pressure sensor, a magnetic sensor, an acceleration sensor, a grip sensor, a proximity sensor, a color sensor (e.g.: RGB sensors), an infrared (IR) sensor, a biometric sensor, a temperature sensor, a humidity sensor, an illuminance sensor, or sensors (e.g.: an inertial measurement unit (IMU), a global positioning system (GPS) sensor, a camera, light imaging detection and ranging (LIDAR), radio detection and ranging (RADAR), or the like) related to an autonomous driving car.

The interface 3777 may support one or more designated protocols that may be used by the electronic device 3710 to be directly or wirelessly connected to an external electronic device (e.g.: the electronic device 3702). According to an embodiment, the interface 3777 may include, for example, a high definition multimedia interface (HDMI), a universal serial bus (USB) interface, a secure digital (SD) card interface, or an audio interface.

A connection terminal 3778 may include a connector via which the electronic device 3710 may be physically connected to an external electronic device (e.g.: the electronic device 3702). According to an embodiment, the connection terminal 3778 may include, for example, an HDMI connector, a USB connector, an SD card connector, or an audio connector (e.g., a headphone connector).

The haptic module 3779 may convert an electrical signal into a mechanical stimulus (e.g., vibration or movement) or an electrical stimulus that the user may recognize via a haptic or kinesthetic sense. According to an embodiment, the haptic module 3779 may include, for example, a motor, a piezoelectric element, or an electrical stimulation device.

The camera module 3780 may capture still images and moving images. According to an embodiment, the camera module 3780 may include one or more lenses, image sensors, image signal processors, or flashes.

According to an embodiment, when the camera module 3780 is included in the transmission UE, the camera module 3780 may obtain a point cloud by photographing an object such as human or thing.

The power management module 3788 may manage power supplied to the electronic device 3710. According to an embodiment, the power management module 3788 may be implemented as, for example, at least a part of a power management integrated circuit (PMIC).

The battery 3789 may supply power to at least one element of the electronic device 3710. According to an embodiment, the battery 3789 may include, for example, a non-rechargeable primary cell, a rechargeable secondary cell, or a fuel cell.

The communication module 3790 may support establishment of a direct (e.g., wired) communication channel or a wireless communication channel between the electronic device 3710 and an external electronic device (e.g., the electronic device 3702, the electronic device 3704, or the server 3708) and performance of communication via the established communication channel. The communication module 3790 may include one or more communication processors that operate independently of the processor 3720 (e.g.: an application processor) and support direct (e.g., wired) communication or wireless communication. According to an embodiment, the communication module 3790 may include a wireless communication module 3792 (e.g.: a cellular communication module, a short-range communication module, or a global navigation satellite system (GNSS) communication module) or a wired communication module 3794 (e.g., a local area network (LAN) communication module or a power line communication module). The corresponding communication module among these communication modules may communicate with the external electronic device via the first network 3798 (e.g., a short-range communication network such as Bluetooth, wireless fidelity direct (Wi-Fi direct), or infrared data association (IrDA)) or the second network 3799 (e.g., a long-range communication network such as a cellular network, the Internet, or a computer network (e.g., LAN or WAN)). Alternatively, the communication module may communicate with an external electronic device via a sidelink of LTE or 5G which uses an unlicensed spectrum or Wi-Fi direct. These various types of communication modules may be integrated into one element (e.g., a single chip) or may be implemented as a plurality of elements (e.g., multiple chips) that separate from each other.

The wireless communication module 3792 may identify and authenticate the electronic device 3710 in a communication network such as the first network 3798 or the second network 3799 by using subscriber information (e.g., international mobile subscriber identity (IMSI)) stored in the subscriber identification module 3796.

The antenna module 3797 may transmit or receive a signal or power to or from the outside (e.g., the external electronic device). According to an embodiment, the antenna module 3797 may include an antenna including a conductor formed on a substrate (e.g., a printed circuit board (PCB)) or a radiator including a conductive pattern. According to an embodiment, the antenna module 3797 may include a plurality of antennas. In this case, at least one antenna appropriate for a communication scheme used in a communication network such as the first network 3798 or the second network 3799 may be selected from among the plurality of antennas by, for example, the communication module 3790. The signal or power may be transmitted or received between the communication module 3790 and the external electronic device via the selected at least one antenna. According to some embodiments, other elements (e.g., a radio frequency integrated circuit (RFIC)) in addition to the radiator may be additionally formed as a part of the antenna module 3797.

At least some of the above elements may be connected to each other via a communication scheme between peripheral devices (e.g., bus, general-purpose input and output (GPIO), serial peripheral interface (SPI), or mobile industry processor interface (MIPI)) and may exchange signals (e.g., command or data) with each other.

According to an embodiment, the command or data may be transmitted or received between the electronic device 3710 and the external electronic device 3704 via the server 3708 connected to the second network 3799. Each of the external electronic devices 3702 and 3704 may be the same as or different from the electronic device 3710.

According to an embodiment, all or some of the operations executed by the electronic device 3710 may be executed by one or more external electronic devices among the external electronic devices 3702, 3704 and 3708. For example, when the electronic device 3710 needs to perform a function or service automatically or in response to a request from the user or another device, the electronic device 3710 may request the one or more external electronic devices 3702 and 3704 to perform at least a portion of the function or service additionally or instead of executing the function or service by itself. The one or more external electronic devices 3702 and 3704 that have received the request may execute at least a portion of the requested function or service or an additional function or service related to the request and may transmit the execution result thereof to the electronic device 3710. The electronic device 3710 may provide the execution result as it is or may additionally process and provide the processing result thereof as at least a portion of a response to the request.

According to an embodiment of the present disclosure, an operating method of a transmission UE in a wireless communication system may include obtaining a point cloud by photographing an object, transmitting, to a reception UE, a message including a parameter for transmission and reception of the point cloud, wherein the parameter for transmission and reception of the point cloud includes at least one of a parameter associated with a direction of the object or a space parameter associated with the object, receiving, from the reception UE, a response message including an application parameter of the reception UE, wherein the application parameter of the reception UE is determined based on the parameter for transmission and reception of the point cloud and a channel state of the reception UE, compressing the point cloud, based on the application parameter of the reception UE, and transmitting, to the reception UE, the compressed point cloud.

According to an embodiment, the parameter associated with the direction of the object may indicate a display direction of the object on an image when the object is displayed on the image by the reception UE, and the parameter for transmission and reception of the point cloud may include an indicator indicating whether to use the parameter associated with the direction of the object.

According to an embodiment, the parameter for transmission and reception of the point cloud may include an indicator indicating whether to use the space parameter associated with the object, and the space parameter associated with the object may include at least one of information indicating a scheme of segmenting the object into one or more regions or information indicating the one or more regions.

According to an embodiment, the parameter for transmission and reception of the point cloud may include at least one of resolution information of an image buffer associated with the compressing of the point cloud, type information of the image buffer, count information of the point cloud, transfer rate information of the point cloud, patch size information of the point cloud, information indicating a priority between the count information of the point cloud and the patch size information of the point cloud.

According to an embodiment of the present disclosure, an operating method of a reception UE in a wireless communication system may include receiving, from a transmission UE, a message including a parameter for transmission and reception of a point cloud, and obtaining the point cloud by photographing an object, wherein the parameter for transmission and reception of the point cloud includes at least one of a parameter associated with a direction of the object or a space parameter associated with the object, determining an application parameter of the reception UE, based on a channel state of the reception UE and the parameter for transmission and reception of the point cloud, transmitting, to the transmission UE, a response message including the determined application parameter of the reception UE, receiving, from the transmission UE, the point cloud, wherein the point cloud is compressed based on the application parameter of the reception UE, and displaying an image associated with the object, based on the compressed point cloud.

According to an embodiment, the parameter associated with the direction of the object may indicate a display direction of the object on an image when the object is displayed on the image by the reception UE, and the parameter for transmission and reception of the point cloud may include an indicator indicating whether to use the parameter associated with the direction of the object.

According to an embodiment, the determining of the application parameter of the reception UE may include identifying, from the parameter for transmission and reception of the point cloud, the indicator indicating whether to use the parameter associated with the direction of the object, and determining at least one among display directions of the object, based on the channel state of the reception UE or a predetermined reference.

According to an embodiment, the parameter for transmission and reception of the point cloud may include an indicator indicating whether to use the space parameter associated with the object, and the space parameter associated with the object may include at least one of information indicating a scheme of segmenting the object into one or more regions or information indicating the one or more regions associated with the object.

According to an embodiment, the determining of the application parameter of the reception UE may include identifying, from the parameter for transmission and reception of the point cloud, the indicator indicating whether to use the space parameter associated with the object, and determining at least one among a plurality of pieces of information indicating the one or more regions associated with the object, based on the channel state of the reception UE or a predetermined reference.

According to an embodiment, the parameter for transmission and reception of the point cloud may include at least one of resolution information of an image buffer associated with the compressing of the point cloud, type information of the image buffer, count information of the point cloud, transfer rate information of the point cloud, patch size information of the point cloud, information indicating a priority between the count information of the point cloud and the patch size information of the point cloud.

According to an embodiment of the present disclosure, a transmission UE in a configured to obtain a point cloud by photographing an object, transmit, to a reception UE via the transceiver, a message including a parameter for transmission and reception of the point cloud, wherein the parameter for transmission and reception of the point cloud includes at least one of a parameter associated with a direction of the object or a space parameter associated with the object, receive, from the reception UE via the transceiver, a response message including an application parameter of the reception UE, wherein the application parameter of the reception UE is determined based on the parameter for transmission and reception of the point cloud and a channel state of the reception UE, compress the point cloud, based on the application parameter of the reception UE, and transmit, to the reception UE via the transceiver, the compressed point cloud.

According to an embodiment, the parameter associated with the direction of the object may indicate a display direction of the object on an image when the object is displayed on the image by the reception UE, and the parameter for transmission and reception of the point cloud may include an indicator indicating whether to use the parameter associated with the direction of the object.

According to an embodiment, the parameter for transmission and reception of the point cloud may include an indicator indicating whether to use the space parameter associated with the object, and the space parameter associated with the object may include at least one of information indicating a scheme of segmenting the object into one or more regions or information indicating the one or more regions.

According to an embodiment, the parameter for transmission and reception of the point cloud may include at least one of resolution information of an image buffer associated with the compressing of the point cloud, type information of the image buffer, count information of the point cloud, transfer rate information of the point cloud, patch size information of the point cloud, information indicating a priority between the count information of the point cloud and the patch size information of the point cloud.

According to an embodiment of the present disclosure, a reception UE in a configured to receive, from a transmission UE via the transceiver, a message including a parameter for transmission and reception of a point cloud, and obtain the point cloud by photographing an object, wherein the parameter for transmission and reception of the point cloud includes at least one of a parameter associated with a direction of the object or a space parameter associated with the object, determine an application parameter of the reception UE, based on a channel state of the reception UE and the parameter for transmission and reception of the point cloud, transmit, to the transmission UE via the transceiver, a response message including the determined application parameter of the reception UE, receive, from the transmission UE via the transceiver, the point cloud, wherein the point cloud is compressed based on the application parameter of the reception UE, and display an image associated with the object, based on the compressed point cloud.

According to an embodiment, the parameter associated with the direction of the object may indicate a display direction of the object on an image when the object is displayed on the image by the reception UE, and the parameter for transmission and reception of the point cloud may include an indicator indicating whether to use the parameter associated with the direction of the object.

According to an embodiment, the at least one processor may be configured to identify, from the parameter for transmission and reception of the point cloud, the indicator indicating whether to use the parameter associated with the direction of the object, and determine at least one among display directions of the object, based on the channel state of the reception UE or a predetermined reference.

According to an embodiment, the parameter for transmission and reception of the point cloud may include an indicator indicating whether to use the space parameter associated with the object, and the space parameter associated with the object may include at least one of information indicating a scheme of segmenting the object into one or more regions or information indicating the one or more regions associated with the object.

According to an embodiment, the at least one processor may be configured to identify, from the parameter for transmission and reception of the point cloud, the indicator indicating whether to use the space parameter associated with the object, and determine at least one among a plurality of pieces of information indicating the one or more regions associated with the object, based on the channel state of the reception UE or a predetermined reference.

According to an embodiment, the parameter for transmission and reception of the point cloud may include at least one of resolution information of an image buffer associated with the compressing of the point cloud, type information of the image buffer, count information of the point cloud, transfer rate information of the point cloud, patch size information of the point cloud, information indicating a priority between the count information of the point cloud and the patch size information of the point cloud.

The methods according to the embodiments described in the claims or the detailed description of the present disclosure may be implemented in hardware, software, or a combination of hardware and software.

When the methods are implemented in software, a computer-readable storage medium or a computer program product having one or more programs (software modules) stored therein may be provided. The one or more programs stored in the computer-readable storage medium or the computer program product are configured to be executable by one or more processors in an electronic device. The one or more programs include instructions to cause the electronic device to execute the methods according to the embodiments described in the claims or the detailed description of the present disclosure.

The programs (e.g., software modules or software) may be stored in random access memory (RAM), non-volatile memory including flash memory, read only memory (ROM), electrically erasable programmable read-only memory (EE-PROM), a magnetic disc storage device, a CD-ROM, digital versatile discs (DVD), another type of optical storage device, or a magnetic cassette. Alternatively, the programs may be stored in a memory including a combination of some or all of the above-mentioned memory devices. In addition, each memory may refer to a plurality of memories.

Also, the programs may be stored in an attachable storage device which is accessible via a communication network such as the Internet, an intranet, a local area network (LAN), a wireless LAN (WLAN), or a storage area network (SAN), or a combination thereof. The storage device may be connected via an external port to an apparatus according to the embodiments of the present disclosure. Also, another storage device on the communication network may be connected to the apparatus performing the embodiments of the present disclosure.

In the present disclosure, the terms "computer program product" or "computer-readable recording medium" are used to totally indicate a medium such as a memory, a hard disc mounted in a hard disk drive, and a signal. The "computer program product" or the "computer-readable recording medium" is a means to be provided to the method of controlling transmission or reception of data in a wireless communication system according to the present disclosure.

In the afore-described embodiments of the present disclosure, elements included in the present disclosure are expressed in a singular or plural form according to the embodiments. However, the singular or plural form is appropriately selected for convenience of descriptions and the present disclosure is not limited thereto. As such, an element expressed in a plural form may also be configured as a single element, and an element expressed in a singular form may also be configured as plural elements.

Specific embodiments are described in the description of the present disclosure, but it will be understood that various modifications may be made without departing the scope of the present disclosure. Thus, the scope of the present disclosure is not limited to the embodiments described herein and should be defined by the appended claims and their equivalents.

The invention claimed is:

1. An operating method of a transmission user equipment (UE) in a wireless communication system, the operating method comprising:

obtaining a point cloud corresponding to an object;

transmitting, to a reception UE, a message comprising a parameter for transmission and reception of the point cloud, wherein the parameter for transmission and reception of the point cloud comprises a parameter associated with a direction of the object, a space parameter associated with the object, a first indicator indicating whether to use the parameter associated with the direction of the object, and a second indicator indicating whether to use the space parameter associated with the object;

receiving, from the reception UE, a response message comprising an application parameter of the reception UE, wherein the application parameter of the reception UE indicates a parameter that is applicable to the reception UE based on a channel state of the reception UE and the parameter for transmission and reception of the point cloud;

compressing the point cloud, based on the application parameter of the reception UE; and transmitting, to the reception UE, the compressed point cloud.

2. The operating method of claim 1, wherein the parameter associated with the direction of the object indicates a display direction of the object on an image when the object is displayed on the image by the reception UE.

3. The operating method of claim 1, wherein the space parameter associated with the object comprises at least one of information indicating a scheme of segmenting the object into one or more regions or information indicating the one or more regions.

4. The operating method of claim 1, wherein the parameter for transmission and reception of the point cloud comprises at least one of resolution information of an image buffer associated with the compressing of the point cloud, type information of the image buffer, count information of the point cloud, transfer rate information of the point cloud, patch size information of the point cloud, information indicating a priority between the count information of the point cloud and the patch size information of the point cloud.

5. An operating method of a reception user equipment (UE) in a wireless communication system, the operating method comprising:

receiving, from a transmission UE, a message comprising a parameter for transmission and reception of a point cloud corresponding to an object, wherein the parameter for transmission and reception of the point cloud comprises a parameter associated with a direction of the object, a space parameter associated with the object, a first indicator indicating whether to use the parameter associated with the direction of the object, and a second indicator indicating whether to use the space parameter associated with the object;

determining an application parameter of the reception UE, based on a channel state of the reception UE and the parameter for transmission and reception of the point cloud;

transmitting, to the transmission UE, a response message comprising the determined application parameter of the reception UE;

receiving, from the transmission UE, the point cloud, wherein the point cloud is compressed based on the application parameter of the reception UE;

displaying an image associated with the object, based on the compressed point cloud; and in case of deterioration of the channel state transmitting to the transmission UE, a temporary maximum media bit-rate request (TMMBR) message requesting to decrease bitrate.

6. The operating method of claim 5, wherein the parameter associated with the direction of the object indicates a display direction of the object on an image when the object is displayed on the image by the reception UE.

7. The operating method of claim 6, wherein the determining of the application parameter of the reception UE comprises:

identifying, from the parameter for transmission and reception of the point cloud, the indicator indicating whether to use the parameter associated with the direction of the object; and determining at least one among display directions of the object, based on the channel state of the reception UE or a predetermined reference.

8. The operating method of claim 5, wherein the space parameter associated with the object comprises at least one of information indicating a scheme of segmenting the object into one or more regions or information indicating the one or more regions associated with the object.

9. The operating method of claim 8, wherein the determining of the application parameter of the reception UE comprises:

identifying, from the parameter for transmission and reception of the point cloud, the indicator indicating whether to use the space parameter associated with the object; and determining at least one among a plurality of pieces of information indicating the one or more regions associated with the object, based on the channel state of the reception UE or a predetermined reference.

10. The operating method of claim 5, wherein the parameter for transmission and reception of the point cloud comprises at least one of resolution information of an image buffer associated with the compressing of the point cloud, type information of the image buffer, count information of the point cloud, transfer rate information of the point cloud, patch size information of the point cloud, information indicating a priority between the count information of the point cloud and the patch size information of the point cloud.

11. A transmission user equipment (UE) in a wireless communication system, the transmission UE comprising:

a transceiver; and at least one processor configured to:

obtain a point cloud corresponding to an object, transmit, to a reception UE via the transceiver, a message comprising a parameter for transmission and reception of the point cloud, wherein the parameter for transmission and reception of the point cloud comprises a parameter associated with a direction of the object, a space parameter associated with the object, a first indicator indicating whether to use the parameter associated with the direction of the object and a second indicator indicating whether to use the space parameter associated with the object, receive, from the reception UE via the transceiver, a response message comprising an application parameter of the reception UE, wherein the application parameter of the reception UE indicates a parameter that is applicable to the reception UE based on a channel state of the reception UE and the parameter for transmission and reception of the point cloud, compress the point cloud, based on the application parameter of the reception UE, and transmit, to the reception UE via the transceiver, the compressed point cloud.

12. The transmission UE of claim 11, wherein the parameter associated with the direction of the object indicates a display direction of the object on an image when the object is displayed on the image by the reception UE.

13. The transmission UE of claim 11, wherein the space parameter associated with the object comprises at least one of information indicating a scheme of segmenting the object into one or more regions or information indicating the one or more regions.

14. The transmission UE of claim 11, wherein the parameter for transmission and reception of the point cloud comprises at least one of resolution information of an image buffer associated with the compressing of the point cloud, type information of the image buffer, count information of the point cloud, transfer rate information of the point cloud, patch size information of the point cloud, information indicating a priority between the count information of the point cloud and the patch size information of the point cloud.

15. A reception user equipment (UE) in a wireless communication system, the reception UE comprising:

a transceiver; and at least one processor configured to:

receive, from a transmission UE, a message comprising a parameter for transmission and reception of a point cloud corresponding to an object, wherein the parameter for transmission and reception of the point cloud comprises a parameter associated with a direction of the object, a space parameter associated with the object, a first indicator indicating whether to use the parameter associated with the direction of the object, and a second indicator indicating whether to use the space parameter associated with the object, determine an application parameter of the reception UE, based on a channel state of the reception UE and the parameter for transmission and reception of the point cloud, transmit, to the transmission UE, a response message comprising the determined application parameter of the reception UE, receive, from the transmission UE, the point cloud, wherein the point cloud is compressed based on the application parameter of the reception UE, display an image associated with the object, based on the compressed point cloud, and in case of deterioration of the channel state transmit, to the transmission UE, a temporary maximum media bit-rate request (TMMBR) message requesting to decrease bitrate.

16. The reception UE of claim 15, wherein the parameter associated with the direction of the object indicates a display direction of the object on an image when the object is displayed on the image by the reception UE.

17. The reception UE of claim 16, wherein the at least one processor is further configured to:

identify, from the parameter for transmission and reception of the point cloud, the indicator indicating whether to use the parameter associated with the direction of the object, and determine at least one among display directions of the object, based on the channel state of the reception UE or a predetermined reference.

18. The reception UE of claim 15, wherein the space parameter associated with the object comprises at least one of information indicating a scheme of segmenting the object into one or more regions or information indicating the one or more regions associated with the object.

19. The reception UE of claim 18, wherein the at least one processor is further configured to:

identify, from the parameter for transmission and reception of the point cloud, the indicator indicating whether to use the space parameter associated with the object, and determine at least one among a plurality of pieces of information indicating the one or more regions associated with the object, based on the channel state of the reception UE or a predetermined reference.

20. The reception UE of claim 15, wherein the parameter for transmission and reception of the point cloud comprises at least one of resolution information of an image buffer associated with the compressing of the point cloud, type information of the image buffer, count information of the point cloud, transfer rate information of the point cloud, patch size information of the point cloud, information indicating a priority between the count information of the point cloud and the patch size information of the point cloud.

* * * * *